(12) United States Patent
Ilola et al.

(10) Patent No.: US 12,056,811 B2
(45) Date of Patent: Aug. 6, 2024

(54) DYNAMIC RE-LIGHTING OF VOLUMETRIC VIDEO

(71) Applicant: Nokia Technologies Oy, Espoo (FI)

(72) Inventors: Lauri Aleksi Ilola, Munich (DE); Lukasz Kondrad, Munich (DE); Sebastian Schwarz, Unterhaching (DE); Christoph Bachhuber, Munich (DE)

(73) Assignee: Nokia Technologies Oy, Espoo (FI)

( * ) Notice: Subject to any disclaimer, the term of this patent is extended or adjusted under 35 U.S.C. 154(b) by 150 days.

(21) Appl. No.: 17/688,970

(22) Filed: Mar. 8, 2022

(65) Prior Publication Data

US 2022/0292763 A1 Sep. 15, 2022

Related U.S. Application Data

(60) Provisional application No. 63/158,973, filed on Mar. 10, 2021.

(51) Int. Cl.
| | |
|---|---|
| *G06T 15/50* | (2011.01) |
| *G06T 15/04* | (2011.01) |
| *G06T 15/08* | (2011.01) |
| *G06T 15/20* | (2011.01) |

(Continued)

(52) U.S. Cl.
CPC ............ *G06T 15/506* (2013.01); *G06T 15/04* (2013.01); *G06T 15/08* (2013.01); *G06T 15/20* (2013.01); *H04N 19/186* (2014.11); *H04N 19/597* (2014.11)

(58) Field of Classification Search
None
See application file for complete search history.

(56) References Cited

U.S. PATENT DOCUMENTS

| | | |
|---|---|---|
| 9,854,176 B2 | 12/2017 | Sanders et al. |
| 10,471,351 B1 | 11/2019 | Ferreyra |
| 2016/0366444 A1 | 12/2016 | Sullivan |

(Continued)

OTHER PUBLICATIONS

"GlTF 2.0 Specification" The Khronos 3D Formats Working Group version 2.0.1, Nov. 23, 2021. https://www.khronos.org/registry/glTF/specs/2.0/glTF-2.0.pdf.

(Continued)

*Primary Examiner* — Nurun Flora
(74) *Attorney, Agent, or Firm* — Joseph C. Drish; Harrington & Smith

(57) ABSTRACT

An apparatus includes at least one processor; and at least one memory including computer program code; wherein the at least one memory and the computer program code are configured to, with the at least one processor, cause the apparatus at least to: obtain a scene comprising three-dimensional information in the form of point clouds, three-dimensional meshes, two-dimensional projections of three-dimensional information, light sources, animations or any other form considered as a representation or description of three-dimensional content; extract lighting information from the obtained scene; process the extracted lighting information into at least one explicit lighting parameter and/or at least one pre-processed lighting map; and encode the scene with the at least one pre-processed lighting map and/or the at least one lighting parameter in a file format or as a visual volumetric video-based coding bitstream.

20 Claims, 10 Drawing Sheets

(51) Int. Cl.
*H04N 19/186* (2014.01)
*H04N 19/597* (2014.01)

(56) References Cited

U.S. PATENT DOCUMENTS

| | | |
|---|---|---|
| 2018/0357780 A1 | 12/2018 | Young et al. |
| 2020/0294271 A1 | 9/2020 | Ilola et al. |
| 2020/0302684 A1 | 9/2020 | Sunkavalli et al. ............ 15/506 |
| 2021/0133929 A1* | 5/2021 | Ackerson ................ G06T 9/001 |
| 2023/0266709 A1* | 8/2023 | Blinder ................ G03H 1/0808 |
| | | 359/9 |

OTHER PUBLICATIONS

Guo, K. et al., "The Relightables Volumetric Performance Capture of Humans with Realistic Relight", ACM Transactions on Graphics, vol. 38, No. 6, Article 217, Nov. 2019, 19 pages.
De Vries, Joey, "Learn OpenGL-Graphics Programming", Sections 13-14 and 43-45, Kendall & Welling, Jun. 17, 2020, 57 pages.
Hamza, A., et al. "Potential Improvement for ISO/IEC 23090-10 Carriage of Visual Volumetric Video-based Coding Data", ISO/IECJTC1/SC29/WG03, N0022, Nov. 20, 2020, 73 pages.
"Information Technology—Coded Representation of Immersive Media—Part 12: MPEG Immersive Video, w2001", ISO/IECJTC1/SC29/WG03, N00049, Jan. 20, 2021, 80 pages.
"Information Technology—coded Representation of Immersive Media—Part 5: Visual Volumetric Video-based Coding (V3C) and Video-based Point Cloud Compression (V-PCC)", ISO/IEC JTC1/SC29/WG11, Nov. 9, 2020, 351 pages.

* cited by examiner

DYNAMIC RE-LIGHTING OF VOLUMETRIC VIDEO

RELATED APPLICATION

This application claims priority to U.S. Provisional Application No. 63/158,973, filed Mar. 10, 2021, which is herein incorporated by reference in its entirety.

TECHNICAL FIELD

The examples and non-limiting embodiments relate generally to volumetric video coding, and more particularly, to dynamic re-lighting of volumetric video.

BACKGROUND

It is known to perform video coding and decoding.

SUMMARY

In accordance with an aspect, an apparatus includes at least one processor; and at least one memory including computer program code; wherein the at least one memory and the computer program code are configured to, with the at least one processor, cause the apparatus at least to: obtain a scene comprising three-dimensional information in the form of point clouds, three-dimensional meshes, two-dimensional projections of three-dimensional information, light sources, animations or any other form considered as a representation or description of three-dimensional content; extract lighting information from the obtained scene; process the extracted lighting information into at least one explicit lighting parameter and/or at least one pre-processed lighting map; and encode the scene with the at least one pre-processed lighting map and/or the at least one lighting parameter in a file format or as a visual volumetric video-based coding bitstream.

In accordance with an aspect, an apparatus includes at least one processor; and at least one memory including computer program code; wherein the at least one memory and the computer program code are configured to, with the at least one processor, cause the apparatus at least to: receive an encoded scene with lighting information signaled in a file format or as a visual volumetric video-based coding bitstream, and with geometry and attributes information associated with the scene; wherein the lighting information comprises at least one pre-processed lighting map or/and at least one lighting parameter associated with the scene; and render a reconstruction of the scene with view-dependent lighting effects on a plurality of surfaces for a given viewer position, using the lighting information and the geometry and attributes information.

In accordance with an aspect, an apparatus includes at least one processor; and at least one memory including computer program code; wherein the at least one memory and the computer program code are configured to, with the at least one processor, cause the apparatus at least to: determine at least one region of a scene of three-dimensional content, where an appearance of the scene varies depending on a viewpoint within a viewing volume from which the scene is consumed; code metadata configured to assist a renderer in a client device to represent the scene in a photorealistic manner regardless of a technology used to render the scene; and signal non-lambertian characteristics of the scene, the signaling comprising at least one lighting map.

In accordance with an aspect, an apparatus includes at least one processor; and at least one memory including computer program code; wherein the at least one memory and the computer program code are configured to, with the at least one processor, cause the apparatus at least to: decode at least one region of an encoded scene, where an appearance of the scene varies depending on a viewpoint within a viewing volume from which the scene is consumed, and where the scene comprises three-dimensional content; decode metadata configured to assist a renderer in a client device to represent the scene in a photorealistic manner regardless of a technology used to render the scene; and receive signaling of non-lambertian characteristics of the scene, the signaling comprising the at least one lighting map.

In accordance with an aspect, a method includes determining at least one region of a scene of three-dimensional content, where an appearance of the scene varies depending on a viewpoint within a viewing volume from which the scene is consumed; coding metadata configured to assist a renderer in a client device to represent the scene in a photorealistic manner regardless of a technology used to render the scene; and signaling non-lambertian characteristics of the scene, the signaling comprising at least one lighting map.

In accordance with an aspect, a method includes decoding at least one region of an encoded scene, where an appearance of the scene varies depending on a viewpoint within a viewing volume from which the scene is consumed, and where the scene comprises three-dimensional content; decoding metadata configured to assist a renderer in a client device to represent the scene in a photorealistic manner regardless of a technology used to render the scene; and receiving signaling of non-lambertian characteristics of the scene, the signaling comprising the at least one lighting map.

In accordance with an aspect, a method includes obtaining a scene comprising three-dimensional information in the form of point clouds, three-dimensional meshes, two-dimensional projections of three-dimensional information, light sources, animations or any other form considered as a representation or description of three-dimensional content; extracting lighting information from the obtained scene; processing the extracted lighting information into at least one explicit lighting parameter and/or at least one pre-processed lighting map; and encoding the scene with the at least one pre-processed lighting map and/or the at least one lighting parameter in a file format or as a visual volumetric video-based coding bitstream.

In accordance with an aspect, a method includes receiving an encoded scene with lighting information signaled in a file format or as a visual volumetric video-based coding bitstream, and with geometry and attributes information associated with the scene; wherein the lighting information comprises at least one pre-processed lighting map or/and at least one lighting parameter associated with the scene; and rendering a reconstruction of the scene with view-dependent lighting effects on a plurality of surfaces for a given viewer position, using the lighting information and the geometry and attributes information.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
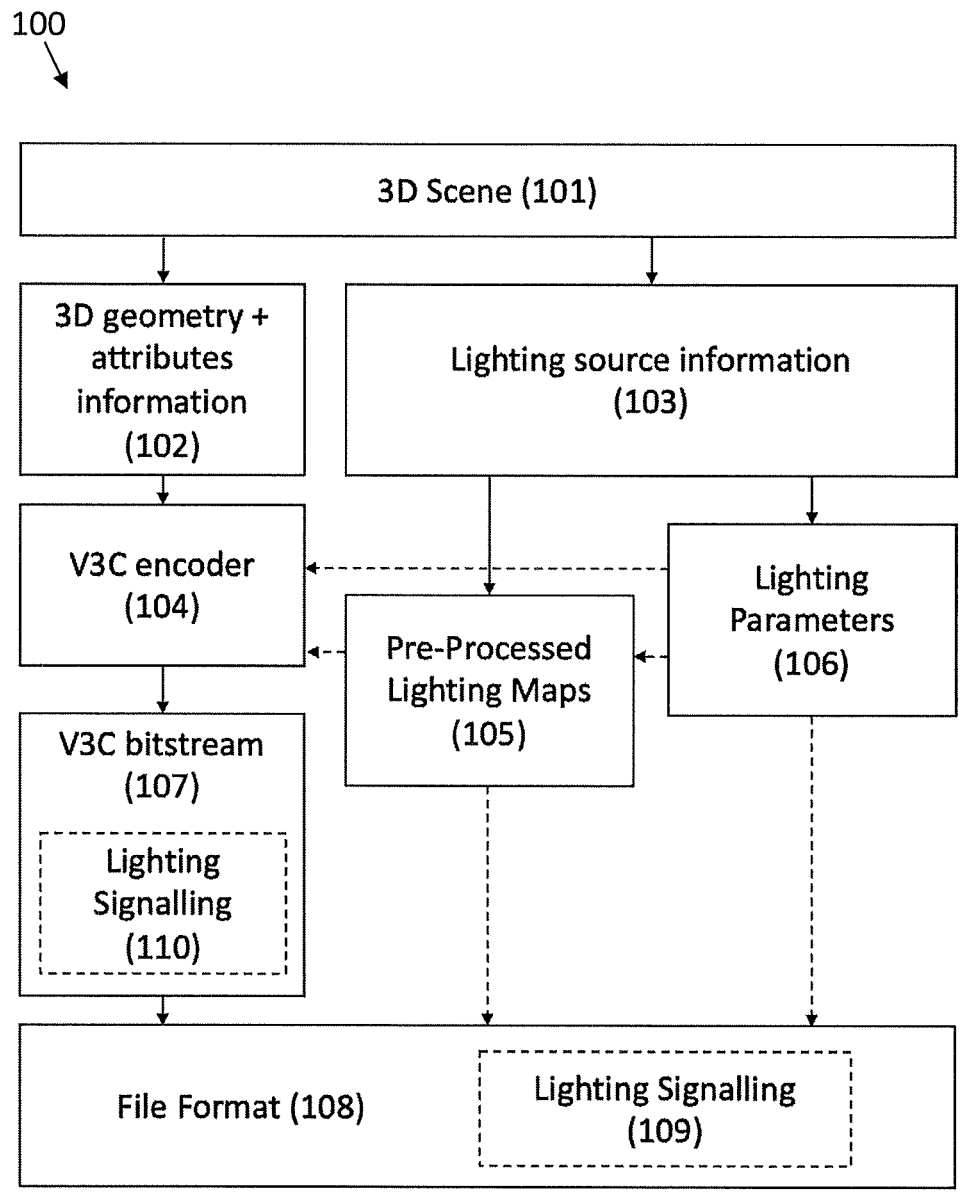
FIG. 1 is an encoder side apparatus configured to implement the examples described herein.

The examples described herein relate to defining and signaling constructs for enabling dynamic re-lighting of volumetric data. In particular, support and signaling in ISO/IEC 23090-5 Visual Volumetric Video-based Coding (V3C) and related systems specification ISO/IEC 23090-10 Carriage of Visual Volumetric Video-based Coding Data (Carriage of V3C) are described.

Volumetric video may be considered as information which represents three dimensional information over a period of time. Visual volumetric video-based coding (V3C) provides a mechanism for encoding volumetric video. Visual volumetric frames are coded by converting the three-dimensional information into a collection of 2D images and associated data by projecting a three dimensional volume into a 2 dimensional view. The converted 2D images are coded using widely available video and image coding specifications and the associated data, i.e., atlas data, is coded according to ISO/IEC FDIS 23090-5.

In general, the compression of volumetric video is achieved by converting the 3D volumetric information into a collection of 2D frames, for which traditional 2D video coding technologies may be applied, and associated data (so called atlas data). The 3D scene is segmented into regions according to heuristics based on, for example, spatial proximity and/or similarity of the data in the region. The segmented regions are projected into 2D patches, where each patch may contain depth, occupancy, texture or other attribute channels. The depth channel contains information based on which the 3D position and shape of the surface voxels can be determined. The patches are further packed into video frames that can be compressed and streamed as a regular 2D video.

The associated metadata, i.e., atlas data, contains information about the patch projection (in 3D) and position of patches in video frames (2D). Client or server-side view synthesis is utilized to reconstruct novel 2D views from patches and associated atlas data. Video encoded frames describing the visual and geometric information of the compressed 3D scene may be streamed over a network using conventional video distribution technologies such as DASH. Atlas data may be streamed as an additional timed data track.

V3C (Visual Volumetric Video-Based Coding)

A V3C bitstream consists of one or more CVSs. A CVS starts with a VPS, included in at least one V3C unit or provided through external means, and contains one or more V3C units that can be factored into V3C composition units.

A CVS consists of multiple V3C sub-bitstreams, with each V3C sub-bitstream associated with a V3C component. V3C component is atlas, occupancy, geometry, or attribute of a particular type that is associated with a V3C volumetric content representation.

At the highest level, V3C data is carried in V3C units, which consist of header and payload pairs. The unit header identifies the type of payload, whereas the payloads carry 2D video bitstreams or atlas data bitstreams depending on the type of payload.

V3C: Atlas Data

Atlas data is contained in atlas_sub_bistream( ) which may contain a sequence of NAL units including header and payload data. nal_unit_header( ) is used to define how to process the payload data. NumBytesInNalUnit specifies the size of the NAL unit in bytes. This value is required for decoding of the NAL unit. Some form of demarcation of NAL unit boundaries is necessary to enable inference of NumBytesInNalUnit. One such demarcation method is specified in Annex D of ISO/IEC 23090-5 for the sample stream format.

An atlas coding layer (ACL) is specified to efficiently represent the content of the atlas data. The NAL is specified to format that data and provide header information in a manner appropriate for conveyance on a variety of communication channels or storage media. All data are contained in NAL units, each of which contains an integer number of bytes. A NAL unit specifies a generic format for use in both packet-oriented and bitstream systems. The format of NAL units for both packet-oriented transport and sample streams is identical except that in the sample stream format specified in Annex D of ISO/IEC 23090-5 each NAL unit can be preceded by an additional element that specifies the size of the NAL unit.

In the nal_unit_header( ) syntax nal_unit_type specifies the type of the RBSP data structure contained in the NAL unit as specified in Table 4 of ISO/IEC 23090-5. nal_layer_id specifies the identifier of the layer to which an ACL NAL unit belongs or the identifier of a layer to which a non-ACL NAL unit applies. Decoders conforming to a profile specified in Annex A of the current version of ISO/IEC 23090-5 are to ignore (i.e., remove from the bitstream and discard) all NAL units with values of nal_layer_id not equal to 0.

ISO/IEC 23090-5 subclauses 8.3.8/8.4.8 specify that such SEI message consists of the variables specifying the type payloadType and size payloadSize of the SEI message payload. SEI message payloads are specified in Annex F of ISO/IEC 23090-5. The derived SEI message payload size payloadSize is specified in bytes and are to be equal to the number of bytes in the SEI message payload.

Table 1 is SEI message metadata syntax as specified in 8.3.8 in ISO/IEC 23090-5

TABLE 1

| | Descriptor |
|---|---|
| sei_message( ) {<br>  payloadType = 0<br>  do {<br>    sm_payload_type_byte<br>    payloadType += sm_payload_type_byte<br>  } while( sm_payload_type_byte == 0xFF )<br>  payloadSize = 0<br>  do{<br>    sm_payload_size_byte<br>    payloadSize += sm_payload_size_byte<br>  } while( sm_payload_size_byte == 0xFF )<br>  sei_payload( payloadType, payloadSize )<br>} | <br><br><br>u(8)<br><br><br><br><br>u(8) |

Non-essential SEI messages are not required by the decoding process. Conforming decoders are not required to process this information for output order conformance.

Specification for presence of non-essential SEI messages is also satisfied when those messages (or some subset of them) are conveyed to decoders (or to the hypothetical reference decoder (HRD)) by other means not specified in ISO/IEC 23090-5. When present in the bitstream, non-essential SEI messages obey the syntax and semantics as specified in Annex F of ISO/IEC 23090-5. When the content of a non-essential SEI message is conveyed for the application by some means other than presence within the bitstream, the representation of the content of the SEI message is not required to use the same syntax specified in Annex F of ISO/IEC 23090-5. For the purpose of counting bits, only the appropriate bits that are actually present in the bitstream are counted.

Essential SEI messages are an integral part of the V3C bitstream and should not be removed from the bitstream. The essential SEI messages are categorized into two types, Type-A essential SEI message and Type-B essential SEI messages.

Type-A essential SEI messages contain information required to check bitstream conformance and for output timing decoder conformance. Every V3C decoder conforming to point A should not discard any relevant Type-A essential SEI messages and is to consider them for bitstream conformance and for output timing decoder conformance.

Regarding Type-B essential SEI messages, V3C decoders that wish to conform to a particular reconstruction profile should not discard any relevant Type-B essential SEI messages and are to consider them for 3D point cloud reconstruction and conformance purposes.

V3C: Attributes Video Data 2D video data is contained in video_sub_bistream( ). One of the types of the video data is attribute video data. An attribute is carried in a V3C unit with vuh_unit_type equal to V3C_AVD. The attribute video data V3C unit header also specifies the index of the attribute, which allows identification of the attribute type based on VPS information and the partition index, which enables an attribute that consists of multiple components to be segmented into smaller component partition units. Such segmentation allows such attribute types to be coded using legacy coding specifications that may be limited in terms of the number of components that they can support. An attribute is a scalar or vector property, optionally associated with each point in a volumetric frame. Such an attribute can e.g. be color, reflectance, surface normal, transparency, material ID, etc. The attribute type is identified in ISO/IEC 23090-5 by the ai_attribute_type_id syntax element. So far, five attribute types have been specified as shown in Table 2.

Table 2 shows the V3C attribute types in ISO/IEC 23090-5.

TABLE 2

| ai_attribute_type_id[j][i] | Identifier | Attribute type |
|---|---|---|
| 0 | ATTR_TEXTURE | Texture |
| 1 | ATTR_MATERIAL_ID | Material ID |
| 2 | ATTR_TRANSPARENCY | Transparency |
| 3 | ATTR_REFLECTANCE | Reflectance |
| 4 | ATTR_NORMAL | Normals |
| 5 ... 14 | ATTR_RESERVED | Reserved |
| 15 | ATTR_UNSPECIFIED | Unspecified |

Mash

Increasing computational resources and advances in 3D data acquisition devices have enabled reconstruction of highly detailed volumetric video representations of natural scenes. Infrared, lasers, time-of-flight and structured light are examples of devices that can be used to construct 3D video data. Representation of the 3D data depends on how the 3D data is used. Dense voxel arrays have been used to represent volumetric medical data. In 3D graphics, polygonal meshes are extensively used.

A polygon mesh is a collection of vertices, edges and faces that define the shape of a polyhedral object in 3D computer graphics and solid modeling. The faces usually consist of triangles (triangle mesh), quadrilaterals (quads), or other simple convex polygons (n-gons), since this simplifies rendering, but may also be more generally composed of concave polygons, or even polygons with holes.

Objects created with polygon meshes are represented by different types of elements. These include vertices, edges, faces, polygons and surfaces. In many applications, only vertices, edges and either faces or polygons are stored.

A vertex defines a position, i.e. a point, in a 3D space defined as (x, y, z) along with other information such as color (r, g, b), normal vector and texture coordinates. An edge is a connection between two vertices, wherein the two vertices are endpoints of the edge. A face is a closed set of edges, in which a triangle face has three edges, and a quad face has four edges. A polygon is a coplanar set of faces. In systems that support multi-sided faces, polygons and faces are equivalent. Surfaces, i.e. smoothing groups, may be used to form a discrete representation of the faces. Smoothing groups are useful, but it is not required to group smooth regions.

Some mesh formats contain groups, which define separate elements of the mesh, and are useful for determining separate sub-objects for skeletal animation or separate actors for non-skeletal animation. Materials are defined to allow different portions of the mesh to use different shaders when rendered.

Most mesh formats also support some form of UV coordinates ("U" and "V" denoting axes of a 2D texture) which are a separate 2D representation of the mesh "unfolded" to show what portion of a 2-dimensional texture map applies to different polygons of the mesh. It is also possible for meshes to contain other such vertex attribute information such as color, tangent vectors, weight maps to control animation, etc. (sometimes also called channels).

Lighting

In computer graphics, a number of techniques are used to simulate light in 3D scenes. Each technique offers flexibility in the level of detail and functionality available, but also operates at different levels of computational demand and complexity. Graphics artists can choose from a variety of shading techniques and effects to suit the needs of each application.

Light sources allow for different ways to introduce light into 3D scenes. Point sources emit light from a single point in all directions, with the intensity of the light decreasing with distance. A directional source uniformly lights a scene from one direction. A spotlight produces a directed cone of light. The light becomes more intense closer to the spotlight source and to the center of the light cone. Ambient light sources illuminate objects even when no other light source is present. The intensity of ambient light is independent of direction, distance, and other objects, meaning the effect is completely uniform throughout the scene. An area light models an emissive surface which can be oriented by an artist.

Lighting models are used to replicate lighting effects in rendered environments where light is approximated based on the simplified physics of light. Without lighting models, replicating lighting effects as they occur in the natural world, e.g. using ray tracing, requires processing power that is unavailable in the vast majority of devices. A lighting model's purpose is to compute the color of every pixel or the amount of light reflected for different surfaces in the scene. There are two main illumination models. These are object oriented lighting models, e.g. a Phong model, that considers each object individually, and global illumination models, e.g. Ray tracing, that consider how light rays interact with the entire scene.

Modern lighting models revolve around approximation of how light behaves on an object surface, and this is commonly referred to as Physically Based Rendering (PBR). PBR has largely replaced Phong shading in modern real-time graphics applications. Ray tracing and global illumination remain more pre-dominant in less real-time intensive applications, such as the special effects industry.

PBR topics that deal with surfaces often rely on a simplified model of the bidirectional reflectance distribution function (BRDF), that approximates optical properties of the material using only a handful of intuitive parameters, and that is quick to compute. glTF separates BRDF shading approximations into two categories, namely metallic-roughness and specular-glossiness, which are mutually exclusive. For metallic-roughness, different maps for the surface are provided for albedo (base-color), roughness factor and metalness factor. Specular-glossiness models surfaces with a diffuse factor, specular factor and glossiness factor. Additional maps for both PBR shading models like normals, occlusion maps or an emissive factor may be provided.

Lately modern graphics have adopted hybrid shading models where ray-tracing and PBR shading are combined. Hybrid rendering pipelines combine rasterization, compute, and ray tracing shaders to work together to enable real-time visuals approaching the quality of offline path tracing. These rendering pipelines started to emerge in the late 2010s along with first ray-tracing oriented hardware platforms.

The math for calculating the color for surfaces is explained here: https://github.com/KhronosGroup/glTF/tree/master/specification/2.0#appendix-b-brdf-implementation (last accessed Feb. 8, 2021). Information about the surface geometry (mesh position), material description of the surface (PBR parameters), scene lighting information (light sources, ambient, environment map, etc.) and the position of the viewer are required for calculating the value of a pixel residing on the surface. Filtering may be applied to further smooth the effects.

Light Sources

As explained above, realistic global illumination is extremely complicated and depends on many parameters. Traditional computer graphics rely on simplified modeling of lighting information that is easier to understand and process. Parameterized light sources along with the surface materials are used in combination to achieve a realistic visual appearance of a 3D modeled object. Traditional light sources may contain for example the following properties as for example defined in the below FOI structure.

```
struct FieldOfIllumination( ) {
    vec3 orientation;
    vec2 opening_angle;
    unsigned foi_type;
}
``` orientation describes the three-dimensional orientation of the field of view constraint.

opening_angle specifies the opening angle of the field of view in the two dimensions perpendicular to orientation.

Table 3 shows FoI types.

TABLE 3

| foi_type | Identifier | FoI Type | Description |
| --- | --- | --- | --- |
| 0 | FOI_CONE | Cone | FoI restricted by a cone shape |
| 1 | FOI_PYRAMID | Pyramid | FoI restricted by a pyramid shape |
| 2 | FOI_UNCONSTRAINED | Unconstrained | Unconstrained FoI | foi_type defines the type of the field of view, as specified in Table 3—FoI Types.

```
struct LightSource( ) {
    vec3 position;
    vec3 ambient;
    vec3 diffuse;
    vec3 specular;
    FieldOfIllumination foi;
    float constant;
    float linear;
    float quadratic;
    unsigned light_source_type;
}
``` position describes the three-dimensional position of the light source in the scene.

ambient specifies the three color components (RGB) of ambient light emitted by the light source.

diffuse specifies the three color components of diffuse light emitted by the light source.

specular specifies the three color components of specular light emitted by the light source.

foi defines the field of view of the light source. If not present, foi is inferred to be unconstrained. Each foi defined in Table 3—FoI Types has a tip, which coincides with the position of the light source.

Table 4 shows light source types.

TABLE 4

| light_source_type | Identifier | Light Source Type | Description |
|---|---|---|---|
| 0 | LS_AMBIENT | Ambient light | Ambient light without position, or any other constraint |
| 1 | LS_POINT | Point light | Single point, emitting light. Possibly constrained by a foi. |
| 2 | LS_SPOT | Spot light | TBD redundant to LS_POINT with foi, for example. |
| 3 | LS_AREA | Area light | e.g. rectangular surface, on which each point emits light in all directions of the same half space, defined by the normal of the area light | light_source_type indicates the kind of light source as specified in Table 4—Light source types.

constant describes the constant part of light attenuation, or the part that is independent of the distance of the light source to the viewer or object.

linear describes with which linear gradient luminosity fades with increasing distance of the light source to the viewer or object.

quadratic is a scalar factor for the quadratic reduction of light source luminosity relative to distance of the light source to the viewer or object.

State of the art rendering of lighting is moving to a physically based approach (PBR), which is a much closer approximation of the observed real-world light physics (but still an approximation). It has two principles: first, conserve energy: never reflect more light than is coming in. Non-metallic surfaces absorb some portion of the incoming light; second, integrate all incoming light over the hemisphere of a point on a surface. The result is scaled by the light's incident angle and by the bidirectional reflective distribution function (BRDF). In addition to viewing direction, incident angle, and surface normal, BRDFs model microfacets (model for surfaces) by a roughness parameter. This roughness influences firstly how well aligned the microfacets are, thus how specular the texture is. Secondly, roughness influences how much self-shadowing is taking place on the texture: given a shallow incident angle of light, in a rough surface, parts of the surface cast shadows on other parts of the texture on the microscopic level. A BRDF also models how reflective a surface is depending on the viewing angle: the smaller the angle of viewing a surface, the more reflective it behaves.

For a surface to be rendered using PBR, it needs to provide the below syntax for each point on the surface (texture element, texel). A texture can be implemented either as struct of arrays or array of structs (which is what is described below).

```
struct PbrTexel( ) {
    vec3 albedo;
    vec3 normal;
    unsigned metallic;
    unsigned roughness;
    unsigned ao;
}
``` albedo defines color, or, for metallic surfaces, the base reflectivity of the texel.

normal a normal map defines in which direction the normal points per texel. This enables rendering of a bumpy surface, even when the underlying polygon is flat.

metallic defines if the texel is metallic or not. metallic can be binary or defined in more weighting levels.

roughness stores the roughness parameter defined previously, influencing how blurry reflections are, and to which amount the texture shadows itself.

ao, or ambient occlusion contains shadows by macroscopic structures in the surface and possibly by neighboring objects.

Image Based Lighting

IBL is a collection of techniques that calculate illumination effects on objects by treating the surrounding environment as one big light source, where the surrounding environment is represented by an image. The image is called an environment map. An environment map is typically representing a cube textured on the inside or an equirectangular projection. The textures of the environment map (i.e. sky and horizon or walls, buildings) are reflected on the object's surface. A lighting equation can assume that each texel of an environment map is an emitter and can be used for calculation.

During the lighting calculation in IBL, the environment maps can be further processed to separate indirect diffuse and specular components of the lighting. An irradiance map is used to represent the diffuse portion and is computed by convolving the environment map with a filter that models which point light sources on the cubemap reach an object in the scene, effectively acting as a low-pass filter. This irradiance map is then used for lighting, possibly with high dynamic range (HDR).

The specular component of lighting may be represented by a pre-filtered environment map that is a pre-computed environment convolution map that takes roughness into account. For each pre-determined roughness level, a pre-filtered specular map is created. The pre-filtered environment map together with a BRDF integration map may be used to calculate the specular lighting component.

When a number of dynamic objects are present in a scene, an environment mapping may require a dynamically rendered cubemap for each object for each frame to be able to reflect other objects in the scene in addition to the static cubemap. For one object, the scene is rendered for all 6 angles (inside faces of the cube) from the object, including rendering of other objects. The resulting cubemap is then used to simulate dynamic reflections on this one object.

It is computationally intensive to sample the environment's lighting from every possible direction as the number of possible directions is theoretically infinite. It is possible to approximate the number of directions by taking a finite number of directions or samples, spaced uniformly or taken randomly from within the hemisphere, to get a fairly accurate approximation of the irradiance, effectively solving the irradiance map or pre-filtered environment map.

Box-Structured File Formats

Box-structured and hierarchical file format concepts have been widely used for media storage and sharing. The most well-known file formats in this regard are the ISO Base Media File Format (ISOBMFF) and its variants such as MP4 and 3GPP file formats.

ISOBMFF allows storage of timely captured audio/visual media streams, called media tracks. The metadata which describes the track is separated from the encoded bitstream itself. The format provides mechanisms to access media data in a codec-agnostic fashion from a file parser perspective.

In files conforming to ISOBMFF, the media data may be provided in one or more instances of MediaDataBox 'mdat', and the MovieBox 'moov' may be used to enclose the metadata for timed media. In some cases, for a file to be operable, both of the 'mdat' and 'moov' boxes may be required to be present. The 'moov' box may include one or more tracks, and each track may reside in one corresponding TrackBox 'trak'. Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

SampleDescriptionBox

The 'trak' box includes in its hierarchy of boxes the SampleTableBox (also known as the sample table or the sample table box). The SampleTableBox contains the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g., VisualSampleEntry, AudioSampleEntry). The type of sample entry form used for derivation the track-type specific sample entry format is determined by the media handler of the track.

```
aligned(8) abstract class SampleEntry (unsigned int(32)
format)
    extends Box(format) {
        const unsigned int(8)[6] reserved = 0;
        unsigned int(16) data_reference_index;
    }
aligned(8) class SampleDescriptionBox (unsigned int(32)
handler_type)
    extends FullBox('stsd', version, 0){
        int i ;
        unsigned int(32) entry_count;
        for (i = 1 ; i <= entry_count ; i++){
            SampleEntry( );    // an instance of a
class derived from
            SampleEntry
        }
    }
```

Specifications deriving Sample Entry classes are defined in ISO/IEC 14496-12. SampleEntry boxes may contain "extra boxes" not explicitly defined in the box syntax of ISO/IEC 14496-12. When present, such boxes are to follow all defined fields and should follow any defined contained boxes. Decoders are to presume a sample entry box could contain extra boxes and are to continue parsing as though they are present until the containing box length is exhausted.

Sync Samples in ISOBNF

Several types of stream access points (SAPs) have been specified. SAP Type 1 corresponds to what is known in some coding schemes as a "Closed group of pictures (GOP) random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than an intra-coded picture associated with the SAP.

A stream access point (SAP) sample group as specified in ISOBMFF identifies samples as being of the indicated SAP type.

A sync sample may be defined as a sample corresponding to SAP type 1 or 2. A sync sample can be regarded as a media sample that starts a new independent sequence of samples; if decoding starts at the sync sample, it and succeeding samples in decoding order can all be correctly decoded, and the resulting set of decoded samples forms the correct presentation of the media starting at the decoded sample that has the earliest composition time. Sync samples can be indicated with the SyncSampleBox (for those samples whose metadata is present in a TrackBox) or within sample flags indicated or inferred for track fragment runs.

Item. in ISOBMaT

Files conforming to the ISOBMFF may contain any non-timed objects, referred to as items, meta items, or metadata items, in a MetaBox 'meta', which may also be called MetaBox. While the name of the meta box refers to metadata, items can generally contain metadata or media data. The meta box may reside at the top level of the file, within a MovieBox 'moov', and within a TrackBox 'trak', but at most one meta box may occur at each of the file level, movie level, or track level. The meta box may be required to contain a HandlerReferenceBox 'hdlr' indicating the structure or format of the MetaBox 'meta' contents. The MetaBox may list and characterize any number of items that can be referred and each one of them can be associated with a file name and can be uniquely identified with the file by item identifier (item_id) which is an integer value. The metadata items may be for example stored in ItemDataBox 'idat' of the MetaBox or in an 'mdat' box or reside in a separate file. If the metadata is located external to the file, then its location may be declared by the DataInformationBox 'dinf'. In the specific case that the metadata is formatted using eXtensible Markup Language (XML) syntax and is required to be stored directly in the MetaBox, the metadata may be encapsulated into either the XMLBox 'xml' or the BinaryXMLBox 'bxml'. An item may be stored as a contiguous byte range, or it may be stored in several extents, each being a contiguous byte range. In other words, items may be stored fragmented into extents, e.g., to enable interleaving. An extent is a contiguous subset of the bytes of the resource, and the resource can be formed by concatenating the extents.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises that still images are stored as items and image sequences are stored as tracks.

In the context of HEIF, the following boxes may be contained within the root-level 'meta' box and may be used as described hereinafter. In HEIF, the handler value of the Handler box of the 'meta' box is 'pict'. The resource (whether within the same file, or in an external file identified by a uniform resource identifier) containing the coded media data is resolved through the DataInformationBox 'dinf', whereas the ItemLocationBox 'iloc' box stores the position and sizes of every item within the referenced file. The ItemReferenceBox 'iref' documents relationships between items using typed referencing. If there is an item among a collection of items that is in some way to be considered the most important compared to others, then this item is signaled by the PrimaryItemBox 'pitm'. Apart from the boxes mentioned here, the 'meta' box is also flexible to include other boxes that may be necessary to describe items.

Any number of image items can be included in the same file. Given a collection of images stored by using the 'meta' box approach, certain relationships may be qualified between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

The ItemPropertiesBox enables the association of any item with an ordered set of item properties. Item properties are small data records. The ItemPropertiesBox consists of two parts: an ItemPropertyContainerBox that contains an implicitly indexed list of item properties, and one or more ItemPropertyAssociationBox(es) that associate items with item properties. An item property is formatted as a box.

A descriptive item property may be defined as an item property that describes rather than transforms the associated item. A transformative item property may be defined as an item property that transforms the reconstructed representation of the image item content.

Typical V3C content consists of geometry and attributes (e.g. color, normal, transparency), where view dependent lighting is baked into the texture data. The texture is essentially painted on a surface making it appear static in relation to the viewing orientation. In addition to pure texture data, V3C enables carriage of attribute information, which may be used to provide further information about the surface such as roughness, normals, or metallicity. This information is meaningful when the client application intends to render view-dependent effects like reflections, refractions, or sub-surface scattering on the surface.

An overlooked aspect of V3C is the lighting information, without which it is impossible to synthesize view-dependent effects on a given surface. Currently V3C does not contain any mechanisms for providing this information. Thus, it is not possible to render viewing direction dependent lighting effects on surfaces as the artist has intended.

Signaling ambient lighting information for traditional 2D video may be useful, to accommodate color correction at the client side to match the editing environment. However it is also useful to consider lighting concepts related to rendering of volumetric video. Usage and generation of temporal environment maps (video instead of a static image) may also be useful. One of the proposed embodiments described herein is related to signaling temporal environment maps along with the rest of the data, for which novel signaling is also provided. Without the signaling part, the environment maps could not be carried as part of the volumetric video bitstream. Content may be adaptively delivered to a client using deferred rendering techniques, where part of the processing may take place on the cloud and part on the device. Utilization of light-maps and shadow-maps may be implemented, while considering temporal and related video compression aspects of said information. It may also be useful to implement foveated rendering of shadows, where pre-calculated shadow maps (in different resolutions) are utilized to render shadows at higher quality near the region of interest and at lower quality further away from the center of attention. The embodiments described herein also provide signaling of pre-calculated shadow maps.

V3C enables carriage of visually compressed volumetric information. It defines carriage for different attribute maps (specularity, normals, etc.), which are useful for rendering view-dependent lighting effects. However, V3C does not provide mechanisms for carriage of light sources, which are an essential part of calculating view-dependent lighting effects. Utilization of attribute maps therefore assumes an external source of lighting information. It would be beneficial to define carriage of lighting information inside V3C to enable view dependent rendering of content as intended by an artist. This disclosure introduces novel ways of signaling lighting information specific for visually compressed volumetric content. New methods along with signaling for generating environment maps from patch data as a basis for synthesizing view-dependent lighting effects are introduced.

A main embodiment includes signaling of lighting information and rendering procedures for volumetric video to enable rendering of view-dependent lighting effects. There are several additional embodiments, among them including utilization of image based dynamic lighting, lighting signaling in V3C, signaling directly in ISOBMFF Box, and signaling a V3C lighting video component in in ISOBMFF.

Utilization of image based dynamic lighting may include creating an environment map for each object, approximating the number of directions by taking a finite number of directions or samples, spaced uniformly or taken randomly from within the hemisphere, transmitting only the sampled information instead of full environment maps, and pre-processing the environment map to calculate the irradiance map and pre-filtered environment map to reduce computational complexity at the rendering.

Lighting signaling in V3C may include several features. Pre-processed light maps may be used as an additional video component that decouples the lighting information from the scene geometry and surface attribute information. Pre-processed light maps may provide higher dynamic range (precision), but lower pixel density than attribute and geometry.

Lighting parameters as parameter sets (VPS, CASPS, ASPS) may be an extension mechanism to close the gap in the existing standard. Pre-processed light maps as lighting patches may utilize a new patch type to allow decoupling the scene geometry and surface attribute information packing from light information packing. The lighting map may be updated as needed, for example not all faces of a cubemap need to be transmitted and the number of cube maps could be packed into one frame, and the pre-processed light maps may be linked to an object.

Pre-processed light maps may be attribute texture patches. Image based lighting may use environment maps (dynamic and separate). Optimization for dynamic lightmaps may be provided, with rendering with lower quality behind the viewport. Pre-processed light maps may include reuse of previously rendered lightmaps when possible, and the pre-processed light maps may be signaled per patch, which texture patches may be directly used as lighting sources. Texture patches may be constructed so that the patches can be directly used as IBL, e.g. as sides of a cube map.

Regarding lighting parameters in VUI, when the lighting information is static during the sequence (e.g. spot light), the information can be part of VUI. Regarding lighting parameters in SEI, when the lighting information is dynamic during the sequence, the information could be provided as part of atlas NAL units, e.g. as a SEI message.

Signaling directly in ISOBMFF Box may include a restricted video track carrying pre-processed light maps, dedicated items carrying pre-processed light maps, LightingVideoBox in SchemeInformationBox, and dynamic lighting parameters as a metadata track. Signaling the V3C lighting video component in ISOBMFF may include a dedicated track reference.

There are several benefits and technical effects of the examples described herein. These include enabling delivery of lighting information required to synthesize view dependent effects on surfaces and to reduce complexity of the calculation on the client side, enabling shadow calculation in a streaming scenario when not all V3C content is downloaded (low resolution environment map is downloaded at low cost), and addressing a gap in the standard.

Figure 2:
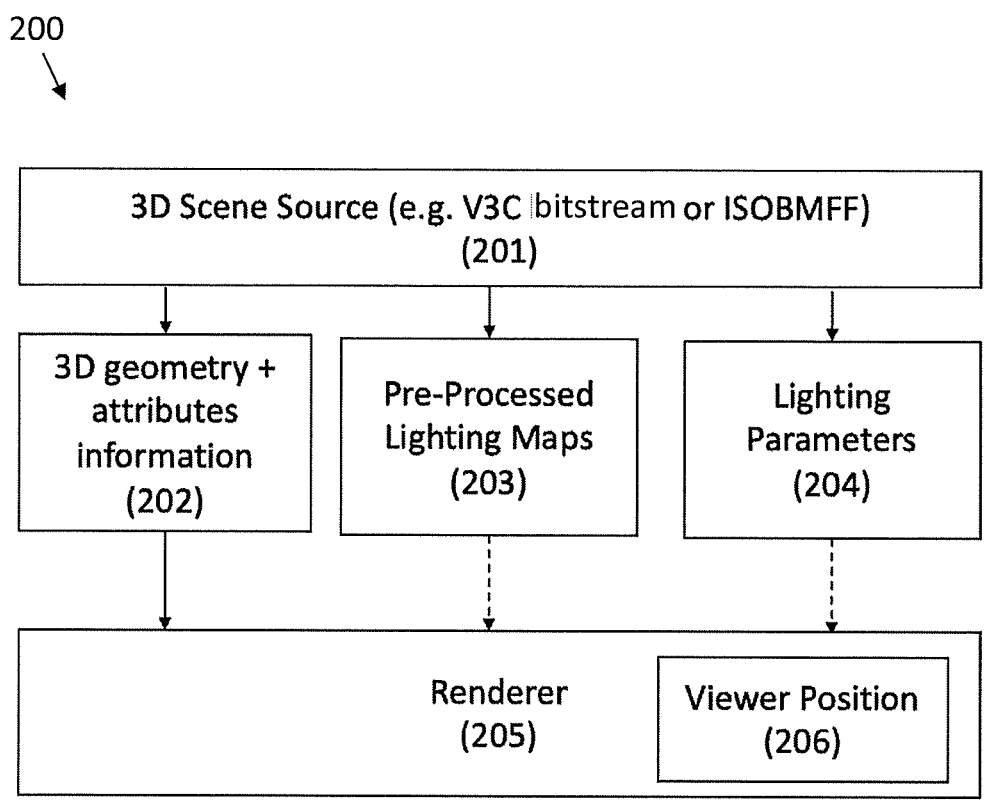
FIG. 2 is a decoder side apparatus configured to implement the examples described herein.

FIG. 1 shows an encoder side apparatus 100 configured to implement dynamic re-lighting of volumetric video. FIG. 2 shows a decoder side apparatus 200 configured to implement dynamic re-lighting of volumetric video.

With reference to FIG. 1 and FIG. 2, signaling of lighting information (109, 110) including pre-processed lighting maps (105, 203) and lighting parameters (106, 204) for volumetric video in or along a bitstream (107, 108) enables rendering of view-dependent lighting effects by rendering engine (205). Signaling may be achieved using V3C level constructs (107, 110) or file format level methods (108, 109).

A client receives an encoded 3D scene (201) encapsulated in a file format (108) or as V3C bitstream (107). The renderer (205) reconstructs a 3D scene (such as 3D scene 101) utilizing the decoded 3D geometry and attributes information (202) to render view-dependent lighting effects on a surface for a given viewer position (206) utilizing pre-processed lighting maps (203, 105) and lighting parameters (204, 106).

Figure 3:
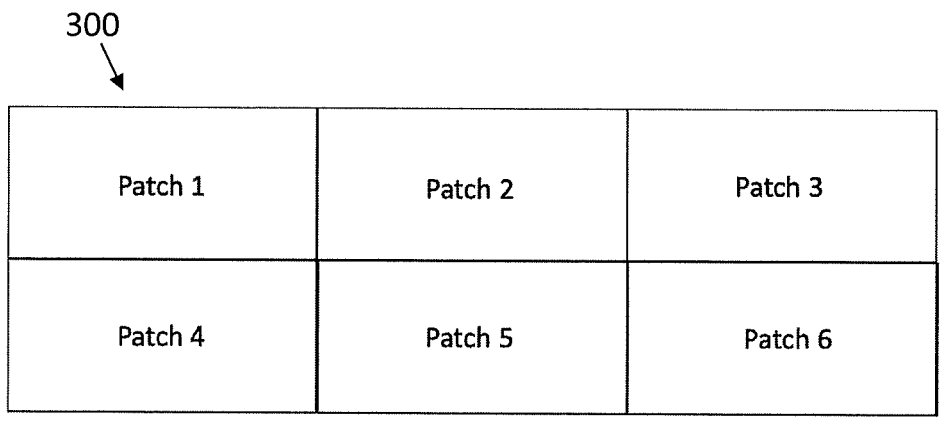
FIG. 3 shows six patches in a frame each representing one cube map face.

As further shown in FIG. 1, the apparatus 100 encodes the 3D scene 101. The apparatus 100 may use at least 3D geometry and attributes information 102 to encode the 3D scene 101. The scene may include 3D content consisting of point clouds (V3C/V-PCC input), 3D meshes, and/or 2D source views projected from the real world (TMIV input). Utilization of Image Based Dynamic Lighting In one embodiment, lighting source information (103) is utilized to pre-render a scene and create Pre-Processed Lighting Maps (105). In one embodiment, Pre-Processed Lighting Maps (105) would be an environment map capturing the scene with lighting information from the center of the scene. The environment map represented by a cube map could be mapped to patches 1-6, as shown in FIG. 3 where each patch of frame 300 represents a cube face. The patches may be transmitted as a separate video component, i.e. a lighting video component, or as a separate attribute type, i.e. a lighting attribute identified by Lighting Signaling (110).

Figure 4:
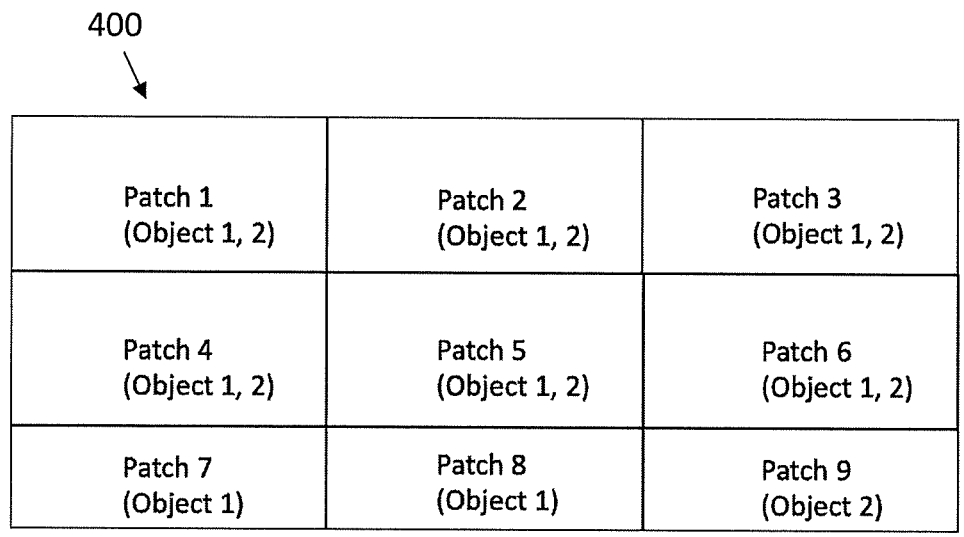
FIG. 4 shows nine patches in a frame, six patches representing common information and three patches representing a specific object.

In another embodiment, demonstrated with FIG. 4, Pre-Processed Lighting Maps (105), e.g. an environment map, is calculated for each object in the scene or for one or more pre-defined positions in a scene, where the one or more pre-defined positions in the scene are signaled in Lighting Parameters (106). Utilizing the patch nature of V3C, each environment map is not stored as a whole but common parts of the environment maps are identified and the amount of data is reduced. Accordingly, FIG. 4 shows nine patches in a frame 400 each representing information, where six patches are representing common information (namely patches 1, 2, 3, 4, 5, and 6) and three patches are representing for a specific object (namely patches 7, 8, and 9).

Figure 5:
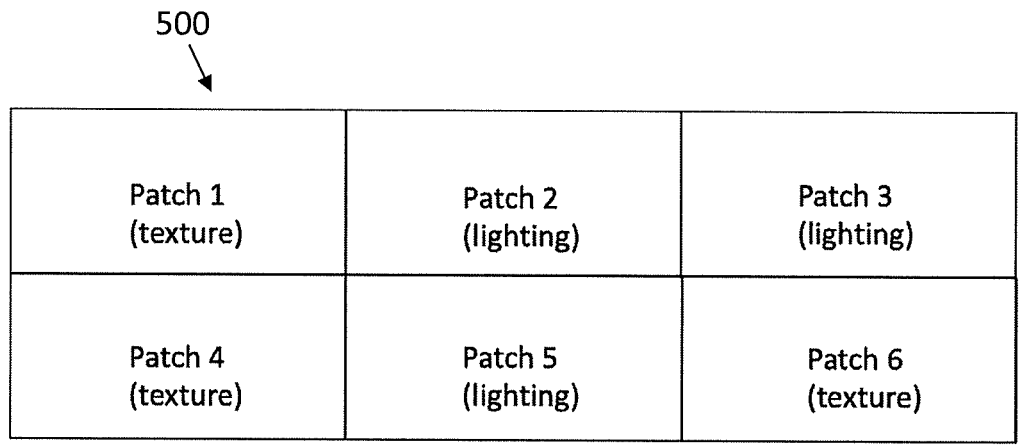
FIG. 5 shows six patches containing interleaved texture and lighting information.

In another embodiment Pre-Processed Lighting Maps (105), e.g. an environment map, can be transmitted as patches together with attribute texture as presented on FIG. 5 with the frame 500.

In another embodiment environment maps could be further pre-processed so Pre-Processed Lighting Maps (105) could represent i) an irradiance map, which contains the sum of all indirect diffuse light hitting a surface from a given direction. It could be utilized to calculate the diffuse lighting for an object in a scene; or ii) a BRDF integration map and a pre-filtered environment map that could be utilized to calculate the specular lighting component.

In another embodiment Lighting parameters (106, 204) would provide the information how the environment maps were processed and how the pre-processed lighting maps could be utilized by the renderer (205).

In one embodiment sampling data for the irradiance map may be provided as additional metadata in Lighting Signaling/Parameters (109, 110, 204) helping to generate the irradiance map or pre-filtered environment map from the environment map in real-time during rendering. As described herein, it is difficult to solve the entire irradiance of a scene in real-time considering that there is an unlimited number of directions to sample from. The most important directions may be provided along with the environment map, helping to generate the irradiance map in real-time. Also, there are several methods that enable sampling of irradiance maps in real-time.

Figure 6:
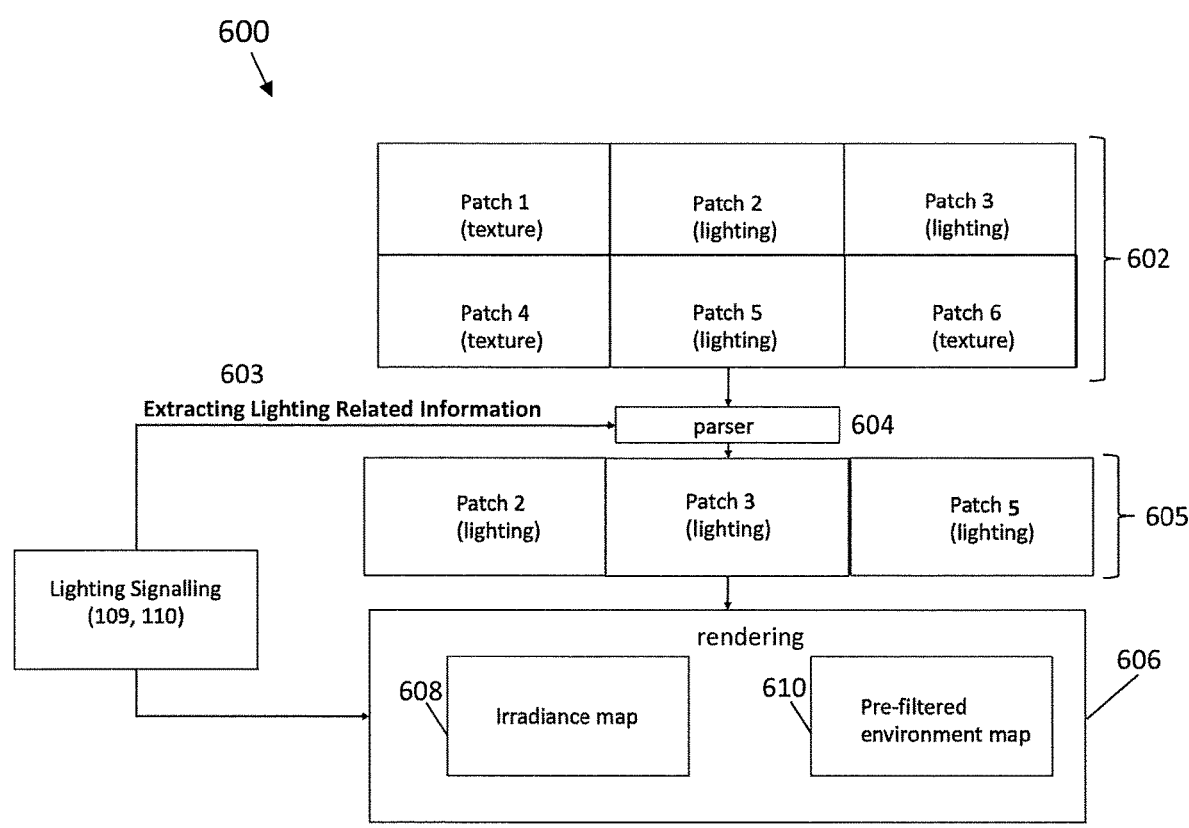
FIG. 6 is an example diagram how lighting signaling can be utilized on the rendering side.

FIG. 6 provides an example decoder workflow 600 for generating irradiance maps utilizing regular texture attribute patches and information from Lighting signaling (110).

First, patches 2, 3 and 5 from the atlas 602 are identified as patches containing lighting information (collectively 605) and are passed to rendering 606. Parser 604 identifies the patches containing lighting information, by for example extracting lighting related information 603 from lighting signaling (109, 110). Using the patch data and atlas related information, rendering engine 606 can generate an environment map, where for example the patches may directly contain cube faces for it. Second, the patches are converted into an environment map using the metadata from the V3C bitstream, which may contain information on patch projections or type of patches or to which object the environment map applies to, or where in the scene the environment map should be placed. Conversion into an environment map is for illustration purposes only; in practice reconstruction of the environment map is not necessary, as the irradiance may be calculated from patches directly. Third, the irradiance map 608 and pre-filtered environment map 610 are sampled from the environment map or directly from patches by using pre-defined sampling directions as described Lighting parameters (204) that are provided by Lightning Signaling (109, 110).

In one embodiment an additional metadata in Lighting Parameters (106, 204) can be provided that includes the individual lighting source type, position, color/strength, and orientation. Individual lighting information may be used in combination with pre-computed or real-time generated lighting maps to enable more efficient light contribution from lights that are relatively close to the viewing position. This information could be described by syntax structures defined herein (struct LightSource( )).

Lighting Signalling in V3C (110)

Pre-Processed Lighting Maps (105) as Additional Video Component

Pre-Processed Lighting Map (105) can change per frame and can be encoded as a video sequence. They can be transmitted as part of the V3C bitstream in the V3C unit with a new identifier V3C_LVD. Table 5 provides a description of vuh_unit_types.

Table 5 is a description of vuh_unit_types.

TABLE 5

| vuh_unit_type | Identifier | V3C unit type | Description |
|---|---|---|---|
| 0 | V3C_VPS | V3C parameter set | V3C level parameters |
| 1 | V3C_AD | Atlas data | Atlas information |
| 2 | V3C_OVD | Occupancy video data | Occupancy information |
| 3 | V3C_GVD | Geometry video data | Geometry information |
| 4 | V3C_AVD | Attribute video data | Attribute information |
| 5 | V3C_PVD | Packed video data | Packing information |
| 6 | V3C_CAD | Common atlas data | Information that is common for atlases in a CVS. Specified in ISO/IEC 23090-12 |
| 7 | V3C_LVD | Lighting video data | Lighting information |
| 8 . . . 31 | V3C_RSVD | Reserved | — |

A V3C unit header with a vuh_unit_type equal to new identifier V3C_LVD would also allow enable identification of the lighting index vuh_lighting_index.

| | Descriptor |
|---|---|
| v3c_unit_header( ) { | |
|   vuh_unit_type | u(5) |
|   if( vuh_unit_type == V3C_AVD \|\| vuh_unit_type == V3C_GVD \|\| | |
|     vuh_unit_type == V3C_OVD \|\| vuh_unit_type == V3C_AD \|\| | |
|     vuh_unit_type == V3C_CAD \|\| vuh_unit_type == V3C_PVD ) | |
|     vuh_v3c_parameter_set_id | u(4) |
|   if( vuh_unit_type == V3C_AVD \|\| vuh_unit_type == V3C_GVD \|\| | |
|     vuh_unit_type == V3C_OVD \|\| vuh_unit_type == V3C_AD \|\| | |
|     vuh_unit_type == V3C_PVD ) | |
|     vuh_atlas_id | u(6) |
|   if( vuh_unit_type == V3C_LVD ) { | |
|     vuh_lighting_common | u(1) |
|     if( !vuh_lighting_common ) | |
|       vuh_atlas_id | u(6) |
|     vuh_lighting_index | u(4) |
|   } | |
|   if( vuh_unit_type == V3C_AVD ) { | |
|     vuh_attribute_index | u(7) |
|     vuh_attribute_partition_index | u(5) |
|     vuh_map_index | u(4) |
|     vuh_auxiliary_video_flag | u(1) |
|   } else if( vuh_unit_type == V3C_GVD ) { | |
|     vuh_map_index | u(4) |
|     vuh_auxiliary_video_flag | u(1) |
|     vuh_reserved_zero_12bits | u(12) |
|   } else if( vuh_unit_type==V3C_OVD \|\| vuh_unit_type == V3C_AD \|\| | |
|     vuh_unit_type == V3C_PVD ) | |
|     vuh_reserved_zero_17bits | u(17) |
|   else if( vuh_unit_type == V3C_CAD ) | |
|     vuh_reserved_zero_23bits | u(23) |
|   else | |
|     vuh_reserved_zero_27bits | u(27) |
| } | |
| v3c_unit_payload( numBytesInV3CPayload ) { | |
|   if( vuh_unit_type == V3C_VPS ) | |
|     v3c_parameter_set( numBytesInV3CPayload ) | |
|   else if( vuh_unit_type == V3C_AD | |
|     \|\| vuh_unit_type == V3C_CAD ) | |
|     atlas_sub_bitstream( numBytesInV3CPayload ) | |
|   else if( vuh_unit_type == V3C_OVD \|\| | |
|     vuh_unit_type == V3C_GVD \|\| | |
|     vuh_unit_type == V3C_AVD \|\| | |
|     vuh_unit_type == V3C_PVD \|\| | |
|     vuh_unit_type == V3C_LVD ) | |
|     video_sub_bitstream( numBytesInV3CPayload ) | |
| } | | vuh_lighting_aomon equal to 1 indicates that the lighting data carried in the Lighting Video Data unit is applicable to all atlases in the V3C sequence. vuh_lighting_common equal to 0 indicates that the lighting data carried in the Lighting Video Data unit is applicable to an atlas with atlas ID equal to vuh_atlas_id.

vuh_lighting_index indicates the index of the lighting data carried in the Lighting Video Data unit. The value of vuh_lighting_index should be in the range of 0 to vle_lighting_count[vuh_atlas_id]−1), inclusive.

Note the comparison vuh_unit_type==V3C_LVD within the above code for v3c_unit_payload( ).

Lighting Parameters (106) as Part of VPS, CASPS and ASPS.

A Pre-Processed Lighting Map (105) transmitted by a V3C unit identified by vuh_unit_type equal to new identifier V3C_LVD can be interpreted by information provided in a V3C Parameter Set (VPS), Common Atlas Sequence Parameter Set (CASPS) and an Atlas Sequence Parameter Set (ASPS).

|  | Descriptor |
|---|---|
| v3c_parameter_set( numBytesInV3CPayload ) { |  |
|   profile_tier_level( ) |  |
|   vps_v3c_parameter_set_id | u(4) |
|   vps_reserved_zero_8bits | u(8) |
|   vps_atlas_count_minus1 | u(6) |
|   for(k = 0; k < vps_atlas_count_minus1 + 1; k++ ) { |  |
|     vps_atlas_id[ k ] | u(6) |
|     j = vps_atlas_id[ k ] |  |
|     vps_frame_width[ j ] | ue(v) |
|     vps_frame_height[ j ] | ue(v) |
|     vps_map_count_minus1[ j ] | u(4) |
|     if( vps_map_count_minus1[ j ] > 0 ) |  |
|       vps_multiple_map_streams_present_flag[ j ] | u(1) |
|     vps_map_absolute_coding_enabled_flag[ j ][ 0 ] = 1 |  |
|     vps_map_predictor_index_diff[ j ][ 0 ] = 0 |  |
|     for( i = 1; i <= vps_map_count_minus1[ j ]; i++ ) { |  |
|       if( vps_multiple_map_streams_present_flag[ j ] ) |  |
|         vps_map_absolute_coding_enabled_flag[ j ][ i ] | u(1) |
|       else |  |
|         vps_map_absolute_coding_enabled_flag[ j ][ i ] = 1 |  |
|       if( vps_map_absolute_coding_enabled_flag[ j ][ i ] == 0 ) { |  |
|         vps_map_predictor_index_diff[ j ][ i ] | ue(v) |
|       } |  |
|     } |  |
|     vps_auxiliary_video_present_flag[ j ] | u(1) |
|     vps_occupancy_video_present_flag[ j ] | u(1) |
|     vps_geometry_video_present_flag[ j ] | u(1) |
|     vps_attribute_video_present_flag[ j ] | u(1) |
|     if( vps_occupancy_video_present_flag[ j ] ) |  |
|       occupancy_information( j ) |  |
|     if( vps_geometry_video_present_flag[ j ] ) |  |
|       geometry_information( j ) |  |
|     if( vps_attribute_video_present_flag[ j ] ) |  |
|       attribute_information( j ) |  |
|   } |  |
|   vps_extension_present_flag | u(1) |
|   if( vps_extension_present_flag ) { |  |
|     vps_packing_information_present_flag | u(1) |
|     vps_miv_extension_present_flag | u(1) |
|     vps_lighting_extension_present_flag | u(1) |
|     vps_extension_5bits | u(6) |
|   } |  |
|   if( vps_packing_information_present_flag ) { |  |
|     for( k = 0 ; k <= vps_atlas_count_minus1; k++ ) { |  |
|       j = vps_atlas_id[ k ] |  |
|       vps_packed_video_present_flag[ j ] |  |
|       if( vps_packed_video_present_flag[ j ] ) |  |
|         packing_information( j ) |  |
|     } |  |
|   } |  |
|   if( vps_miv_extension_present_flag ) |  |
|     vps_miv_extension( ) /*Specified in ISO/IEC 23090-12 */ |  |
|   if( vps_lighting_extension_present_flag ) |  |
|     vps_lighting_extension( ) |  |
|   if( vps_extension_5bits ) { |  |
|     vps_extension_length_minus1 | ue(v) |
|     for( j = 0; j < vps_extension_length_minus1 + 1; j++ ) { |  |
|       vps_extension_data_byte | u(8) |
|     } |  |
|   } |  |
|   byte_alignment( ) |  |
| } |  | vps_lighting_.kxtension_yresent_flag equal to 1 specifies that the vps_lighting_extension( ) syntax structure is present in the v3c_parameter_set( ) syntax structure. vps_lighting_extension_present_flag equal to 0 specifies that this syntax structure is not present. When not present, the value of vps_lighting_extension_present_flag is inferred to be equal to 0.

vps_miv_extension is under preparation (ISO/IEC CD 23090-12:2020).

|  | Descriptor |
|---|---|
| vps_lighting_extension( ) { |  |
|   vle_common_present_flag | u(1) |
|   if(vle_common_present_flag) |  |
|     vle_common_lighting_count | u(4) |
|   for( l=0; l< vle_common_lighting_count; l++) { |  |
|     vle_common_lighting_type_id[ l ] | u(4) |
|     vle_common_ighting_codec_id[ l ] | u(8) |
|   } |  |
|   vle_atlas_count | u(6) |
|   for( a=0l; a< vle_atlas_count; a++) { |  |
|     vle_atlas_id[ a ] | u(6) |
|     atlasID = vle_atlas_id[ a ] |  |
|     vle_lighting_count[ atlasID ] | u(4) |
|     for( l=0; l< vle_common_lighting_count; l++) { |  |
|       vle_lighting_type_Id[ atlasID ][ l ] | u(4) |
|       vle_lighting_codec_id[atlasID][ l ] | u(8) |
|     } |  |
|   } |  |
| } |  | vle_ommon_present_flag equal to 0 indicates that the V3C sequence does not have lighting video data that is common for all atlases. vie_common_present_flag equal to 1 indicates that the V3C sequence does have lighting video data that is common for all atlases.

vlecommon_lighting_aount indicates the number of lighting videos. vle_common_lighting_count is to be in the range of 0 to 15, inclusive.

vie_common_lighting_type_id[1] indicates the lighting type of the Lighting Video Data unit with index i for the common atlas. Table 6—V3C lighting types describes the list of supported lighting types and their relationship with vle_common_lighting_type_id [1].

vle_camon_lighting_codec_id[1] indicates the identifier of the codec used to compress the lighting video data with index i for the common atlas. vle_common_lighting_codec_id[1] is to be in the range of 0 to 255, inclusive. This codec may be identified through the profiles defined in Annex A of ISO/IEC 23090-5, a component codec mapping SEI message, or through means outside this description.

vle_atlas_count indicates the total number of atlases in the current bitstream that have associated lighting video data. The value of vle_atlas_count is to be in the range of 0 to 63, inclusive.

vle_atlas_id[a] specifies the ID of the atlas with index a. The value of vle_atlas_id[a] is to be in the range of 0 to 63, inclusive. It is a requirement of bitstream conformance to this version of this description that the value of vle_atlas_id[k] is to not be equal to vle_atlas_id[j] for all j !=k.

vl_lighting_count[atlasID] indicates the number of lighting video data associated with an atlas with atlas ID equal to atlasID. vle_common_lighting_count is to be in the range of 0 to 15, inclusive.

vle_lighting_type_id[atlasID][1] indicates the lighting type of the Lighting Video Data unit with index i for the atlas with atlas ID equal to atlasID. Table 6—V3C lighting types describes the list of supported lighting types and their relationship with vle_lighting_type_id[atlasID][1]

vie_lightin_codec_id[atlasID][1] indicates the identifier of the codec used to compress the lighting video data with index 1 for the atlas with atlas ID equal to atlasID. vle_common_lighting_codec_id[1] is to be in the range of 0 to 255, inclusive. This codec may be identified through the profiles defined in Annex A of ISO/IEC 23090-5, a component codec mapping SEI message, or through means outside this description.

Table 6 shows V3C lighting types.

TABLE 6

| vle_lighting_type_id[j][i] | Identifier | Lighting type |
|---|---|---|
| 0 | LGHT_IRRADIANCE_MAP | Irradiance map |
| 1 | LGHT_BRDF_MAP | BRDF integration map |
| 2 | LGHT_PRE_FILTER_ENV_MAP | pre-filtered environment map |
| 3 | LGHT_LIGHT_SOURCES | non-processed light sources |
| 4 | LGHT_ENV_MAP | Environment maps |
| 5 . . . 14 | LGHT_RESERVED | Reserved |
| 15 | LGHT_UNSPECIFIED | Unspecified |

Below is an example raw byte sequence payload common atlas sequence parameter set structure implementation.

|  | Descriptor |
|---|---|
| common_atlas_sequence_parameter_set_rbsp( ) { |  |
|   casps_common_atlas_sequence_parameter_set_id | u(4) |
|   casps_log2_max_common_atlas_frame_order_cnt_lsb_minus4 | ue(v) |
|   casps_extension_present_flag | u(1) |
|   if( casps_extension_present_flag ) { |  |
|     casps_miv_extension_present_flag | u(1) |
|     casps_lighting_extension_present_flag | u(1) |
|     casps_extension_6bits | u(6) |
|   } |  |
|   if( casps_miv_extension_present_flag ) |  |
|     casps_miv_extension( ) /* Specified in ISO/IEC 23090-12 */ |  |
|   if( casps_lighting_extension_present_flag ) |  |
|     casps_lighting_extension( ) |  |
|   if( casps_extension_6bits ) |  |
|     while( more_rbsp_data( ) ) |  |
|       casps_extension_data_flag | u(1) |
|   rbsp_trailing_bits( ) |  |
| } |  | casps_lighting_sactansion_prosant_flag equal to 1 specifies that the casps_lighting_extension( ) syntax structure is present in the common_atlas_sequence_parameter_set_rbsp( ) syntax structure. casps_lighting_extension_yresent_flag equal to 0 specifies that this syntax structure is not present. When not present, the value of casps_lighting_extension_present_flag is inferred to be equal to 0.

Below is an example implementation of a common atlas sequence parameter set lighting extension.

|  | Descriptor |
|---|---|
| casps_lighting_extension( ) { |  |
|   cle_explicit_lights_present_flag | u(1) |
|   if(cle_explicit_lights_present_flag){ |  |
|     cle_num_explicit_lights | u(8) |
|     for(i=0, i<cle_num_explicit_lights, i++){ |  |
|       light_source | ue(v) |
|     } |  |
|   } |  |
|   cle_irradiance_map_sampling_directions_present_flag | u(1) |
|   if(cle_irradiance_map_sampling_directions_present_flag){ |  |
|     cle_num_sampling_directions | u(16) |
|     for(i=0, i<cle_num_sampling_directions, i++){ |  |
|       cle_sampling_direction_x | f(32) |
|       cle_sampling_direction_y | f(32) |

|  | Descriptor |
|---|---|
|     cle_sampling_direction_z | f(32) |
|    } | |
|   } | |
| } | | cle_explicit_lights_present_flag equal to 0 indicates that the V3C sequence does not have explicit light sources. cle_explicit_lights_present_flag equal to 1 indicates that the V3C sequence does have explicit lights present. In some examples it is inferred whether the V3C sequence has or does not have explicit light sources.

cle_num_explicit_lights describes how many explicit lights are present.

light_source defines information for an explicit light source. The syntax is defined herein as structure LightSource( ).

cle_irradiance_map_sampling_directions_prosent_flag equal to 0 indicates that the V3C sequence does not have irradiance map sampling directions. cle_irradiance_map_sampling_directions_present_flag equal to 1 indicates that the V3C sequence does have sampling vectors for the irradiance map.

cle_num_sampling_directions provides the number of sampling directions for the irradiance map.

cle_sampling_vector_x, cle_sampling_vector_y, and cle_sampling_vector_z define components for normalized sampling vectors for generating the irradiance map.

Below is an adaptation of an atlas sequence parameter set raw byte sequence payload to implement lighting as described herein.

|  | Descriptor |
|---|---|
| atlas_sequence_parameter_set_rbsp( ) { | |
|   asps_atlas_sequence_parameter_set_id | ue(v) |
|   asps_frame_width | ue(v) |
|   asps_frame_height | ue(v) |
|   asps_geometry_3d_bit_depth_minus1 | u(5) |
|   asps_geometry_2d_bit_depth_minus1 | u(5) |
|   asps_log2_max_atlas_frame_order_cnt_lsb_minus4 | ue(v) |
|   asps_max_dec_atlas_frame_buffering_minus1 | ue(v) |
|   asps_long_term_ref_atlas_frames_flag | u(1) |
|   asps_num_ref_atlas_frame_lists_in_asps | ue(v) |
|   for( i = 0; i < asps_num_ref_atlas_frame_lists_in_asps; i++ ) | |
|     ref_list_struct( i ) | |
|   asps_use_eight_orientations_flag | u(1) |
|   asps_extended_projection_enabled_flag | u(1) |
|   if( asps_extended_projection_enabled_flag ) | |
|     asps_max_number_projections_minus1 | ue(v) |
|   asps_normal_axis_limits_quantization_enabled_flag | u(1) |
|   asps_normal_axis_max_delta_value_enabled_flag | u(1) |
|   asps_patch_precedence_order_flag | u(1) |
|   asps_log2_patch_packing_block_size | u(3) |
|   asps_patch_size_quantizer_present_flag | u(1) |
|   asps_map_count_minus1 | u(4) |
|   asps_pixel_deinterleaving_enabled_flag | u(1) |
|   if( asps_pixel_deinterleaving_enabled_flag ) | |
|     for( j = 0; j <= asps_map_count_minus1; j++ ) | |
|       asps_map_pixel_deinterleaving_flag[ j ] | u(1) |
|   asps_raw_patch_enabled_flag | u(1) |
|   asps_eom_patch_enabled_flag | u(1) |
|   if( asps_eom_patch_enabled_flag && asps_map_count_minus1 == 0 ) | |
|     asps_eom_fix_bit_count_minus1 | u(4) |
|   if( asps_raw__patch_enabled_flag \|\| asps_eom_patch_enabled_flag ) | |
|     asps_auxiliary_video_enabled_flag | u(1) |
|   asps_plr_enabled_flag | u(1) |
|   if( asps_plr_enabled_flag ) | |
|     asps_plr_information( asps_map_count_minus1 ) | |
|   asps_vui_parameters_present_flag | u(1) |
|   if( asps_vui_parameters_present_flag ) | |
|     vui_parameters( ) | |
|   asps_extension_present_flag | u(1) |
|   if( asps_extension_present_flag ) { | |
|     asps_vpcc_extension_present_flag | u(1) |
|     asps_miv_extension_present_flag | u(1) |
|     asps_lighting_extension_present_flag | u(1) |
|     asps_extension_5bits | u(6) |
|   } | |
|   if( asps_vpcc_extension_present_flag ) | |
|     asps_vpcc_extension( ) /* Specified in Annex H */ | |
|   if( asps_miv_extension_present_flag ) | |
|     asps_miv_extension( ) /* Specified in ISO/IEC 23090-12 */ | |

```
if( asps_lighting_extension_present_flag )                              
  asps_lighting_extension( )                                            
if( asps_extension_5bits )                                              
  while( more_rbsp_data( ) )                                            
    asps_extension_data_flag                                       u(1) 
rbsp_trailing_bits( )                                                   
}                                                                       
``` asps_lighting_axtension_prosent_flag equal to 1 specifies that the syntax structure is present in the atlas_sequencepa-rameter_set_rbsp( ) syntax structure. asps_lighting_extension_present_flag equal to 0 specifies that this syntax structure is not present. When not present, the value of asps_lighting_extension_present_flag is inferred to be equal to 0.

Below is an example implementation of an atlas sequence parameter set lighting extension.

```
                                                             Descriptor
asps_lighting_extension( ) {                                            
  ale_environment_map_in_attribute_present_flag                         
  // Same information as casps_lighting_extension( )                    
}                                                                       
``` ale_environment_map_in_attribute_present_flag equal to 1 specifies that patch data units may contain lighting information.

Pre-Processed Lighting Map (105) as Lighting Patches.

A Pre-Processed Lighting Map (105) can be transmitted by File Format (108) as traditional cubemaps, or when ingested to V3C encoder (104), it can be mapped to patches of V3C. A new patch type can be defined to describe the lighting video components as well to provide mapping information between the pre-processed map patches and scene objects. The mapping can be done based on an object ID provided by a SEI message or an entity ID if present in patches describing the attribute, geometry, and occupancy video components.

Below is an implementation of a patch information data structure.

```
                                                             Descriptor
patch_information_data( tileID, patchIdx, patchMode ) {                 
  if( ath_type == P_TILE ) {                                            
    if( patchMode == P_SKIP )                                           
      skip_patch_data_unit( )                                           
    else if( patchMode == P_MERGE )                                     
      merge_patch_data_unit( tileID, patchIdx )                         
    else if( patchMode == P_INTRA )                                     
      patch_data_unit( tileID, patchIdx )                               
    else if( patchMode == P_INTER )                                     
      inter_patch_data_unit( tileID, patchIdx )                         
    else if( patchMode == P_RAW )                                       
      raw_patch_data_unit( tileID, patchIdx )                           
    else if( patchMode == P_EOM )                                       
      eom_patch_data_unit( tileID, patchIdx )                           
  }                                                                     
  else if( ath_type == I_TILE ) {                                       
    if( patchMode == I_INTRA )                                          
      patch_data_unit( tileID, patchIdx )                               
    else if( patchMode == I_RAW )                                       
      raw_patch_data_unit( tileID, patchIdx )                           
    else if( patchMode == I_EOM )                                       
      eom_patch_data_unit( tileID, patchIdx )                           
```

```
                                                             Descriptor
    else if( patchMode == I_LIGHT )                                     
      lighting_patch_data_unit( tileID, patchIdx )                      
  }                                                                     
}                                                                       
```

Table 7 shows patch modes for I_TILE type atlas tiles, including identifier I_LIGHT that provides a lighting patch mode with atdu_patch_mode [tileID][p]=3.

TABLE 7

| atdu_patch_mode[tileID][p] | Identifier | Description |
|---|---|---|
| 0 | I_INTRA | Non-predicted patch mode |
| 1 | I_RAW | RAW Point Patch mode |
| 2 | I_EOM | EOM Point Patch mode |
| 3 | I_LIGHT | Lighting patch mode |
| 3-13 | I_RESERVED | Reserved modes for future use by ISO/IEC |
| 14 | I_END | Patch termination mode |

Table 8 shows patch types, including a LIGHT patch.

TABLE 8

| Value | Identifier | Description |
|---|---|---|
| 0 | PROJECTED | patch with patch mode equal to I_INTRA, P_INTRA, P_INTER, P_MERGE, or P_SKIP that is associated with projected information onto a 2D image |
| 1 | EOM | patch with patch mode equal to I_EOM, P_EOM, or P_SKIP associated with EOM coded points |
| 2 | RAW | patch with patch mode equal to I_RAW, P_RAW, or P_SKIP associated with RAW coded points |
| 3 | LIGHT | patch with patch mode equal to I_LIGHT that is associated with projected information onto a 2D image and describes lighting information |

Below is an example implementation of a lighting patch data unit.

```
                                                             Descriptor
lighting_patch_data_unit( tileID, p ) {                                 
  lpdu_2d_pos_x[ tileID ][ p ]                                    ue(v) 
  lpdu_2d_pos_y[ tileID ][ p ]                                    ue(v) 
  lpdu_2d_size_x_minus1[ tileID ][ p ]                            ue(v) 
  lpdu_2d_size_y_minus1[ tileID ][ p ]                            ue(v) 
  lpdu_3d_offset_u[ tileID ][ p ]                                  u(v) 
  lpdu_3d_offset_v[ tileID ][ p ]                                  u(v) 
  lpdu_cubemap_face_id[ tileID ][ p ]                              u(3) 
  lpdu_orientation_index[ tileID ][ p ]                            u(3) 
  lpdu_object_count_minus1[ tileID ][ p ]                          u(v) 
  for( i=0; i < lpdu_object_count_minus1 + 1; i++){                u(3) 
    lpdu_object_id[ tileID ][ p ][ i ]                            ue(v) 
  }                                                                     
```

-continued

| | Descriptor |
|---|---|
| lpdu_pre_filtered_map [ tileID ][ p ] | u(1) |
| if (lpdu_pre_filtered_map[ tileID ][ p ]){ | |
|   lpdu_pre_filtered_map_roughness[ tileID ][ p ] | ue(v) |
| } | |
| } | | lpdu_2d_pos_x[tileID][p] specifies the x-coordinate of the top-left corner of the patch bounding box for patch p in the current atlas tile, with tile ID equal to tileID, expressed as a multiple of PatchPackingBlockSize.

lpdu_2d_pos_y[tileID][p] specifies the y-coordinate of the top-left corner of the patch bounding box for patch p in the current atlas tile, with tile ID equal to tileID, expressed as a multiple of PatchPackingBlockSize.

lpdu_2d_size_x_minus1[tileID][p] plus 1 specifies the quantized width value of the patch with index p in the current atlas tile, with tile ID equal to tileID.

lpdu_2d_size_y_minus1[tileID][p] plus 1 specifies the quantized height value of the patch with index p in the current atlas tile, with tile ID equal to tileID.

lpdu_3d_offset_u[tileID][p] specifies the shift to be applied to the reconstructed patch points in the patch with index p of the current atlas tile, with tile ID equal to tileID, along the tangent axis.

lpdu_3d_offset_v[tileID][p] specifies the shift to be applied to the reconstructed patch points in the patch with index p of the current atlas tile, with tile ID equal to tileID, along the bi-tangent axis.

lpdu_cubemap_faoe_id [tileID][p] specifies the values of the cubemap face id for the patch with index p of the current atlas tile, with tile ID equal to tileID.

Table 9 shows a cube map face id mapping.

| lpdu_cubemap_face_id | Identifier | Orientation |
|---|---|---|
| 0 | CUBE_MAP_POSITIVE_X | Right |
| 1 | CUBE_MAP_NEGATIVE_X | Left |
| 2 | CUBE_MAP_POSITIVE_Y | Top |
| 2 | CUBE_MAP_NEGATIVE_Y | Bottom |
| 3 | CUBE_MAP_POSITIVE_Z | Back |
| 3 | CUBE_MAP_NEGATIVE_Z | Front | lpdu_orientation_index[tileID][p] specifies the patch orientation index, for the patch with index p of the current atlas tile, with tile ID equal to tileID.

lpdu_object_count_minus1[tileID][p] plus 1 indicates the total number of objects and associated lighting information within the patch with index p of the current atlas tile, with tile ID equal to tileID.

lpdu_object_id[tileID][p][i] specifies the object ID of the lighting of the patch with index equal to p, in a tile with ID equal to tileID applies. Object ID can be mapped to object ID provided by a scene object information SEI message or to an entity ID provided in the MIV extension.

lpdu_pre_filtered_map[tileID][p] equal to 1 indicates that the lpdu_pre_filtered_map_roughness[tileID] [p] syntax element is present in the lighting_patch_data_unit( ) syntax structure.

lpdu_pre_filtered_map_roughness[tileID][p] indicates the roughness value for which the pre-filtered environment map was calculated.

Pre-Processed Lighting Maps (105) as Attribute Texture Patch Data

In one embodiment information related to pre-processed lighting maps may be stored inside patches. This requires signalling of patch types inside the V3C patch_data_unit. An extension of the patch data unit may be defined as follows:

| | Descriptor |
|---|---|
| patch_data_unit( tileID, patchIdx ) { | |
|   pdu_2d_pos_x[ tileID ][ patchIdx ] | ue(v) |
|   pdu_2d_pos_y[ tileID ][ patchIdx ] | ue(v) |
|   pdu_2d_size_x_minus1[ tileID ][ patchIdx ] | ue(v) |
|   pdu_2d_size_y_minus1[ tileID ][ patchIdx ] | ue(v) |
|   pdu_3d_pffset_u[ tileID ][ patchIdx ] | u(v) |
|   pdu_3d_offset_v[ tileID ][ patchIdx ] | u(v) |
|   pdu_3d_offset_d[ tileID ][ patchIdx ] | u(v) |
|   if( asps_normal_axis_max_delta_value_enabled_flag ) | |
|     pdu_3d_range_d[ tileID ][ patchIdx ] | u(v) |
|   pdu_projection_id[ tileID ][ patchIdx ] | u(v) |
|   pdu_orientation_index[ tileID ][ patchIdx ] | u(v) |
|   if( afps_lod_mode_enabled_flag ) { | |
|     pdu_lod_enabled_flag[ tileID ][ patchIdx ] | u(1) |
|     if( pdu_lod_enabled_flag[ tileID ][ patchIdx ] > 0 ) { | |
|       pdu_lod_scale_x_minus1[ tileID ][ patchIdx ] | ue(v) |
|       pdu_lod_scale_y_idc[ tileID ][ patchIdx ] | ue(v) |
|     } | |
|   } | |
|   if( asps_plr_enabled_flag ) | |
|     plr_data( tileID, patchIdx ) | |
|   if(ale_environment_map_in_attribute_present_flag){ | |
|     pdu_lighting_type_id[ tileID ][ patchIdx ] | u(4) |
|     if(pdu_lighting_type_id[ tileID ][ patchIdx ] == LGHT_PRE_FILTER_ENV_MAP) | |
|       pdu_pre_filtered_map_roughness[ tileID ][ p ] | ue(v) |
|     pdu_cubemap_face_id[ tileID ][ p ] | u(3) |
|     pdu_object_count_minus1[ tileID ][ p ] | u(v) |
|     for( i=0; i < pdu_object_count_minus1 + 1; i++){ | u(3) |
|       pdu_object_id[ tileID ][ p ][ i ] | ue(v) |
|     } | |
|   } | |
| } | | pdu_lighting_type_id[tileID][p] defines the type of the patch as defined in Table 6—V3C lighting types. An unspecified value is to be used to express that the patch is a normal patch and does not contain pre-processed lighting information.

pdu_pre_filtered_map_roughness[tileID][p] indicates the roughness value for which the pre-filtered environment map was calculated.

pdu_object_count_minus1[tileID][p] plus 1 indicates the total number of objects associated with lighting information within the patch with index p of the current atlas tile, with tile ID equal to tileID.

pdu_object_id[tileID][p][i] specifies the object ID of the lighting of the patch with index equal to p, in a tile with ID equal to tileID applies. Object ID can be mapped to the object ID provided by the scene object information SEI message or to the entity ID provided in MIV extension.

Pre-Processed Lighting Maps (105) as Attribute Lighting Patch Data

In one embodiment information related to pre-processed lighting maps may be stored as a new attribute type. The attribute type could have a different layout of the patches in relation to occupancy, geometry and attributes with a type different from ATTR_LIGHT. The different layout of patches may be signaled as in U.S. publication number US 2020-0294271 A1 described by the Applicant/assignee of this disclosure having the same first named inventor.

Table 10 shows V3C attribute types.

| ai_attribute_type_id[j][i] | Identifier | Attribute type |
|---|---|---|
| 0 | ATTR_TEXTURE | Texture |
| 1 | ATTR_MATERIAL_ID | Material ID |
| 2 | ATTR_TRANSPARENCY | Transparency |
| 3 | ATTR_REFLECTANCE | Reflectance |
| 4 | ATTR_NORMAL | Normals |
| 5 | ATTR_LIGHT | Light Information |
| 6 ... 14 | ATTR_RESERVED | Reserved |
| 15 | ATTR_UNSPECIFIED | Unspecified |

The patches related to an attribute of ATTR_LIGHT could be signaled as patches with a lighting extension as described in "Pre-Processed Lighting Maps (105) as attribute texture patch data" or as patches with mode I_LIGHT described in "Pre-Processed Lighting Map (105) as lighting patches."

Lighting Parameters (106) as SEI Message

SEI messages may contain information as defined in the casps_lighting_information( ) syntax structure.

Lighting Parameters (106) as VUI Ambient

SEI messages (including VUI ambient messages) may contain information as defined in the casps_lighting_information( ) syntax structure.

Signaling Directly in ISOMMFF

The Pre-Processed Lighting Map (105) can be encoded directly and encapsulated by the File Format (108) as tracks. Such tracks could be represented in the file as restricted video and dedicated and identified as e.g. 'lght', in the scheme_type field of the SchemeTypeBox of the RestrictedSchemeInfoBox of their restricted video sample entries.

A static Pre-Processed Map (105) can be encoded directly and encapsulated by File Format (108) as an item identified by a type 4CC code, e.g. 'lght'.

Lighting Parameters (106) can be encoded directly and encapsulated by File Format (108) LightingVideoBox in SchemeInformationBox of the RestrictedSchemeInfoBox. An example is shown below.

```
aligned(8) class LightingVideoBox extends
FullBox('lght', version = 0, 0)
{
    template unsigned int(30) reserved = 0;
    casps_lighting_extension( ) // See definition
    earlier in this description
        Box[ ] any_box; // optional
}
```

When Lighting Parameters (106) are dynamic, they could be encoded as a sample of a metadata track. A sample entry is defined as shown below that allows identification of a lighting parameters metadata track containing lighting information samples.

```
Sample Entry Type:   'lght'
Container:           Sample Description Box ('lght')
Mandatory:           No
Quantity:            0 or 1
    aligned(8) class LightingMetadataSampleEntry( )
        extends MetadataSampleEntry ('lght') {
    }
```

Signaling V3C Lighting Video Component in ISOBMFF

Figure 7:
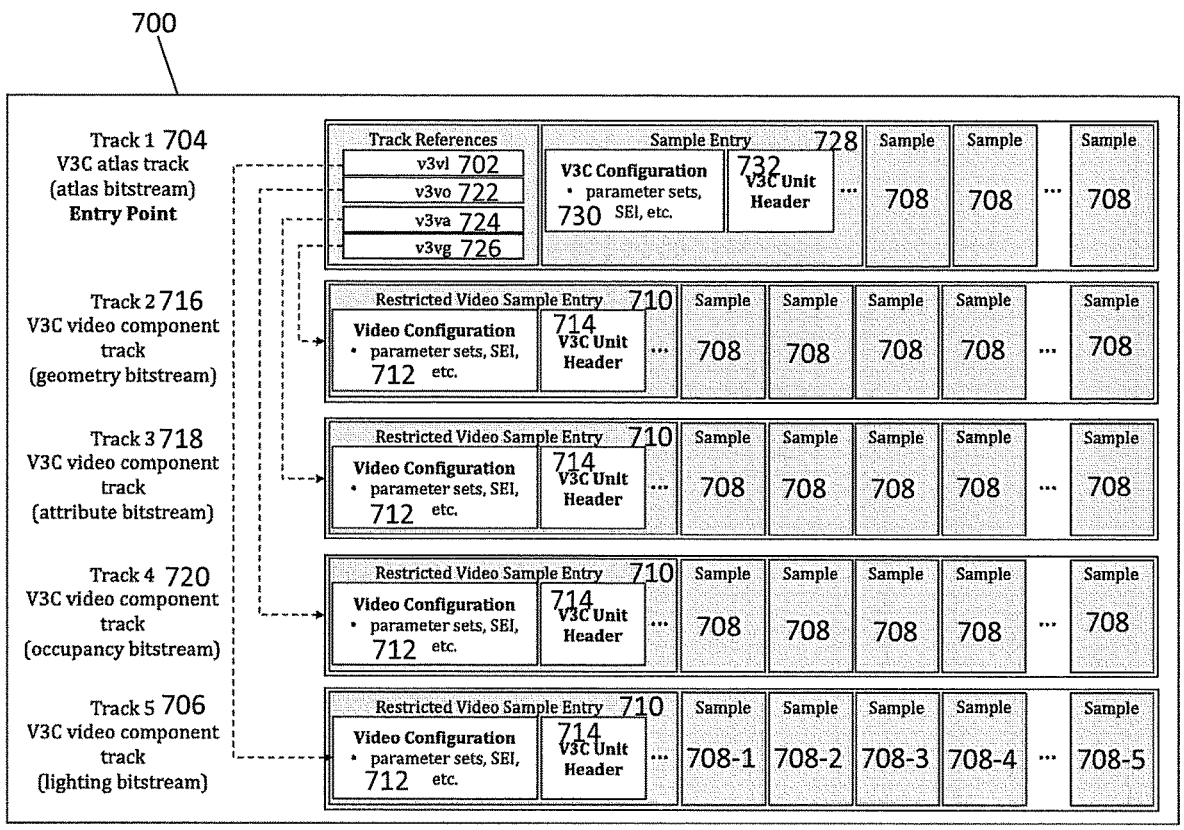
FIG. 7 is an ISOBMFF structure containing a V3C bitstream with lighting information as a new video component.

The track referencing mechanism between the V3C atlas track 704 and the V3C video component track 706 containing lighting information within file format 700 described in FIG. 7 could be provided. In such a case, a single track reference type, which may be called 'v3vl' (refer to item 702) may be used from/to V3C atlas track 704 to/from V3C video component track 706 that describes samples with lighting information originated from V3C units with vuh_unit_type equal to V3C_LVD as described in Table 5. Refer to samples 708-1, 708-2, 708-3, 708-4, and 708-5 described by the V3C video component track 706. FIG. 7 is an ISO base media file format (ISOBMFF) structure containing a V3C bitstream with lighting information as a new video component.

As further shown in FIG. 7, the V3C video component track 706 having the lighting bitstream is comprised of a restricted video sample entry 710, where the restricted video sample entry 710 is comprised of a video configuration 712 and a V3C unit header 714. The video configuration 712 includes parameter sets, SEI, etc. The V3C video component tracks having the geometry, attribute, and occupancy bitstreams (respectively 716, 718, 720) are configured similar to the V3C video component track 706 having the lighting bitstream.

As further shown in FIG. 7, a track reference type called 'v3vo' (refer to item 722) may be used from/to V3C atlas track 704 to/from V3C video component track 720 that describes samples with occupancy information originated from V3C units with vuh_unit_type equal to V3C_OVD as described in Table 5. A track reference type called 'v3va' (refer to item 724) may be used from/to V3C atlas track 704 to/from V3C video component track 718 that describes samples with attribute information originated from V3C units with vuh_unit_type equal to V3C_AVD as described in Table 5. A track reference type called 'v3vg' (refer to item 726) may be used from/to V3C atlas track 704 to/from V3C video component track 716 that describes samples with geometry information originated from V3C units with vuh_unit_type equal to V3C_GVD as described in Table 5.

As further shown in FIG. 7, V3C atlas track 704 includes a sample entry 728 having a V3C configuration 730 and a V3C unit header 732, where the V3C configuration 730 includes parameter sets, SEI, etc. Similar to the V3C video component track 706, each of the V3C atlas track 704, the V3C video component track 716, the V3C video component track 718, and the V3C video component track 720 reference samples 708.

The examples described herein support coding of camera captured natural scenes with non-Lambertian (or non-lambertian) characteristics. When natural scenes with non-Lambertian surfaces are captured, e.g. specular surfaces, transparent objects, etc., the appearance of the scene varies depending on the viewpoint within the viewing volume, from which the scene is consumed. The coding of the scene with non-Lambertian surfaces may include first determining those regions of the scene that express such characteristics and coding of additional meta-data information that help a renderer in the client device to represent the scene in a photorealistic manner, regardless of the rendering technology used.

The examples described herein enable coding a dynamic volumetric scene that contains non-Lambertian surfaces. The examples described herein enable handling of heterogeneous object-specific parameters (e.g. temporal sampling, duration, atlas sizes, and non-Lambertian characteristics) at the MIV bitstream level. A kind of lightning map may be used to signal these non-lambertian characteristics. MIV is to build on the V3C framework. For a list scene description, lighting maps are relevant to providing the overall lighting information for the objects in the scene.

Figure 8:
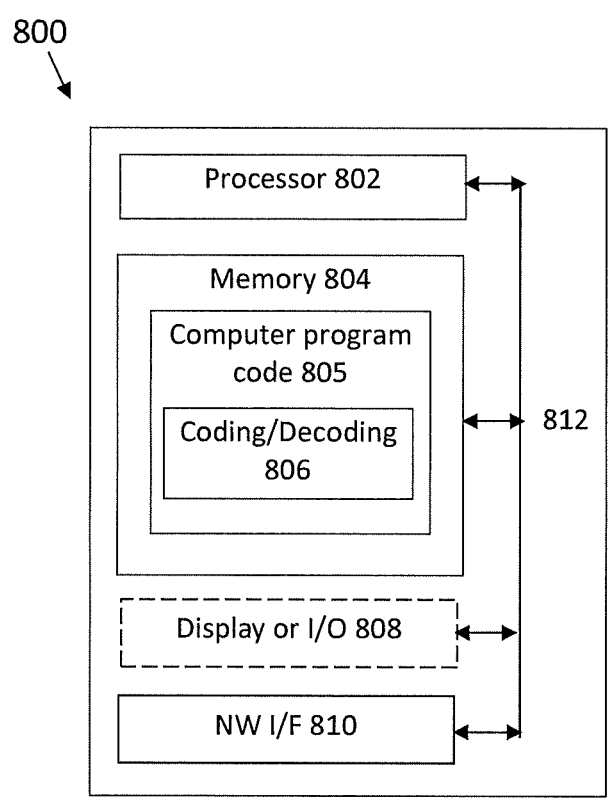
FIG. 8 is an example apparatus to implement dynamic re-lighting of volumetric video, based on the examples described herein.

FIG. 8 is an apparatus 800 which may be implemented in hardware, configured to implement dynamic re-lighting of volumetric video, based on any of the examples described herein. The apparatus comprises a processor 802, at least one memory 804 including computer program code 805, wherein the at least one memory 804 and the computer program code 805 are configured to, with the at least one processor 802, cause the apparatus to implement circuitry, a process, component, module, function, coding, and/or decoding (collectively 806) to implement dynamic re-lighting of volumetric video, based on the examples described herein. The apparatus 800 optionally includes a display and/or I/O interface 808 that may be used to display an output (e.g., an image or volumetric video) of a result of the component 806. The display and/or I/O interface 808 may also be configured to receive input such as user input (e.g. with a keypad). The apparatus 800 also includes one or more network (NW) interfaces (I/F(s)) 810. The NW I/F(s) 810 may be wired and/or wireless and communicate over a channel or the Internet/other network(s) via any communication technique. The NW I/F(s) 810 may comprise one or more transmitters and one or more receivers. The N/W I/F(s) 810 may comprise standard well-known components such as an amplifier, filter, frequency-converter, (de)modulator, and encoder/decoder circuitry(ies) and one or more antennas. In some examples, the processor 802 is configured to implement item 806 without use of memory 804.

The apparatus 800 may be a remote, virtual or cloud apparatus. The apparatus 800 may be either a writer or a reader (e.g. parser), or both a writer and a reader (e.g. parser). The apparatus 800 may be either a coder or a decoder, or both a coder and a decoder. The apparatus 800 may be a user equipment (UE), a head mounted display (HMD), or any other fixed or mobile device.

The memory 804 may be implemented using any suitable data storage technology, such as semiconductor based memory devices, flash memory, magnetic memory devices and systems, optical memory devices and systems, fixed memory and removable memory. The memory 804 may comprise a database for storing data. The memory 804 may be non-transitory, transitory, volatile or non-volatile memory.

Interface 812 enables data communication between the various items of apparatus 800, as shown in FIG. 8. Interface 812 may be one or more buses, or interface 812 may be one or more software interfaces configured to pass data between the items of apparatus 800. For example, the interface 812 may be one or more buses such as address, data, or control buses, and may include any interconnection mechanism, such as a series of lines on a motherboard or integrated circuit, fiber optics or other optical communication equipment, and the like. The apparatus 800 need not comprise each of the features mentioned, or may comprise other features as well. The apparatus may be an embodiment of apparatus 100 or apparatus 200, for example having the features shown in the apparatuses of FIG. 1 and/or FIG. 2.

Figure 9:
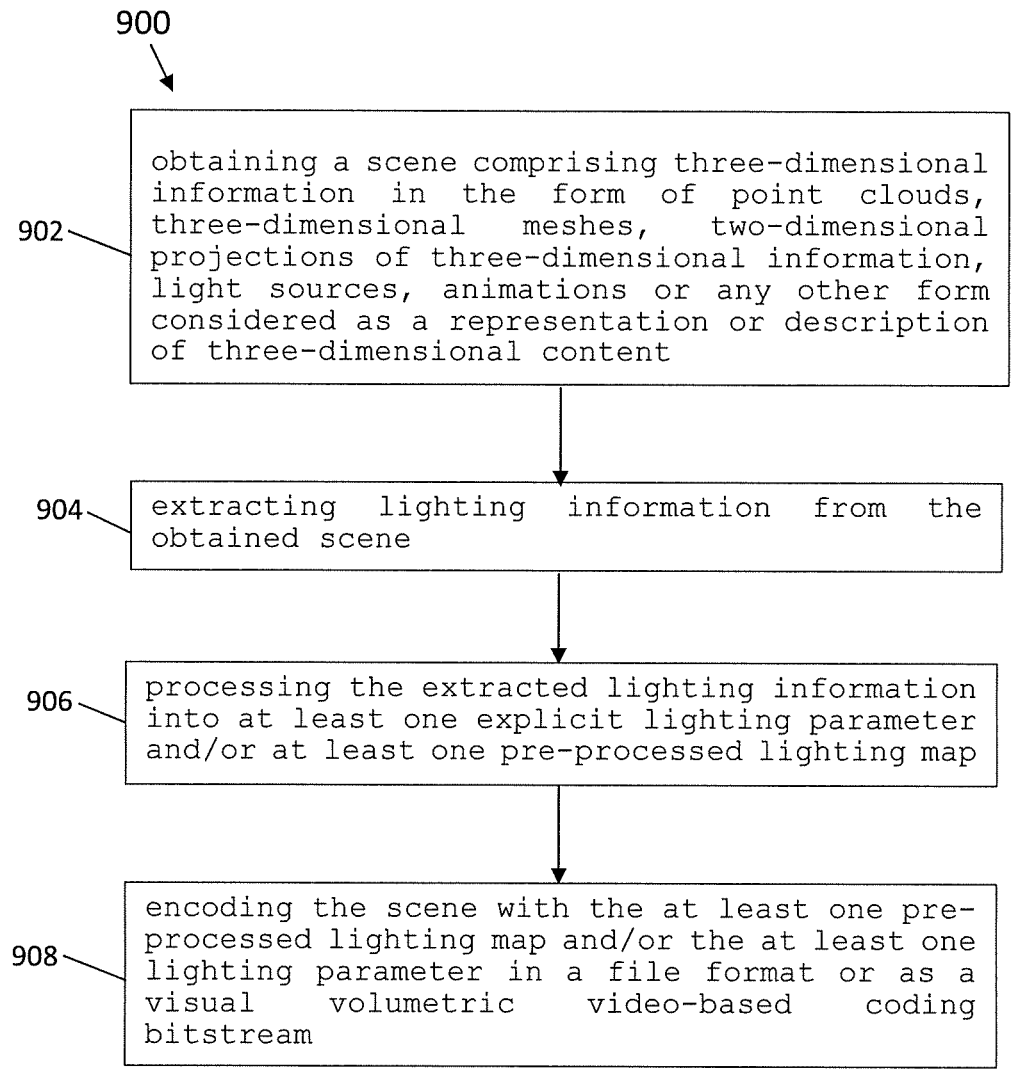
FIG. 9 is an example method to implement dynamic re-lighting of volumetric video, based on the examples described herein.

FIG. 9 is a method 900 to implement dynamic re-lighting of volumetric video, based on the examples described herein. At 902, the method includes obtaining a scene comprising three-dimensional information in the form of point clouds, three-dimensional meshes, two-dimensional projections of three-dimensional information, light sources, animations or any other form considered as a representation or description of three-dimensional content. At 904, the method includes extracting lighting information from the obtained scene. At 906, the method includes processing the extracted lighting information into at least one explicit lighting parameter and/or at least one pre-processed lighting map. At 908, the method includes encoding the scene with the at least one pre-processed lighting map and/or the at least one lighting parameter in a file format or as a visual volumetric video-based coding bitstream. Method 900 may be implemented with apparatus 100 or with apparatus 800.

Figure 10:
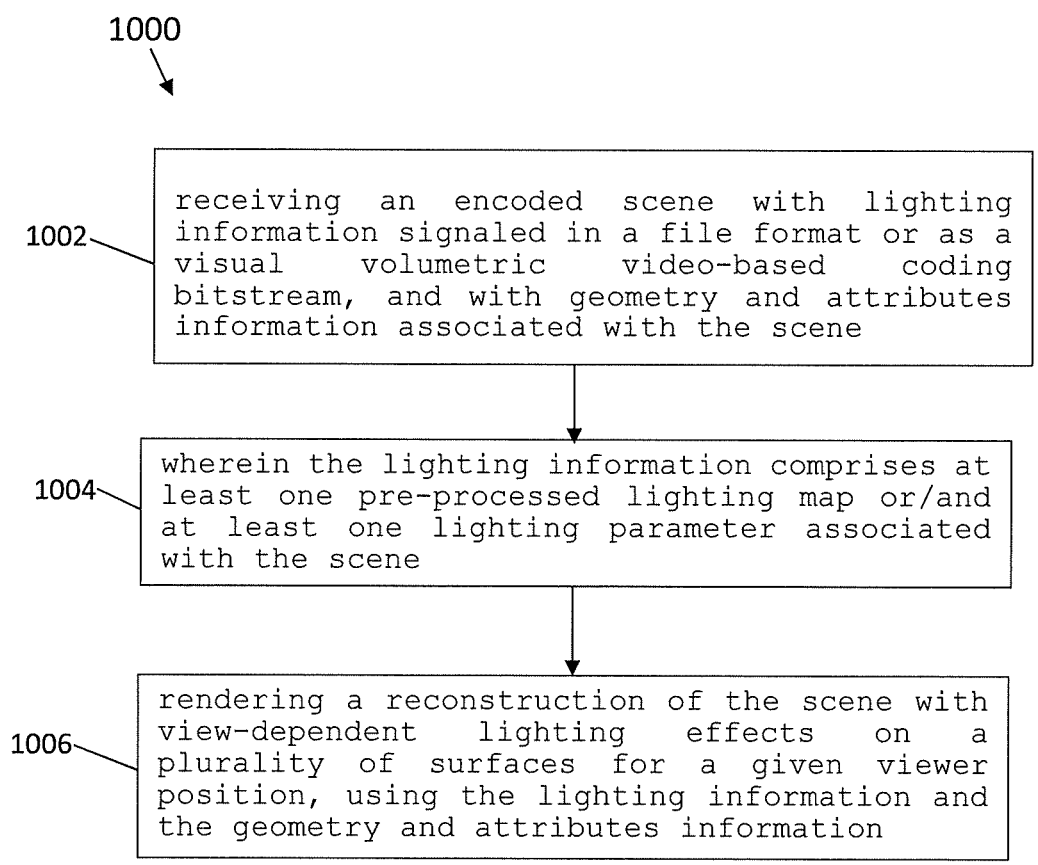
FIG. 10 is another example method to implement dynamic re-lighting of volumetric video, based on the examples described herein.

FIG. 10 is a method 1000 to implement dynamic re-lighting of volumetric video, based on the examples described herein. At 1002, the method includes receiving an encoded scene with lighting information signaled in a file format or as a visual volumetric video-based coding bitstream, and with geometry and attributes information associated with the scene. At 1004, the method includes wherein the lighting information comprises at least one pre-processed lighting map or/and at least one lighting parameter associated with the scene. At 1006, the method includes rendering a reconstruction of the scene with view-dependent lighting effects on a plurality of surfaces for a given viewer position, using the lighting information and the geometry and attributes information. Method 1000 may be implemented with apparatus 200 or with apparatus 800.

Figure 11:
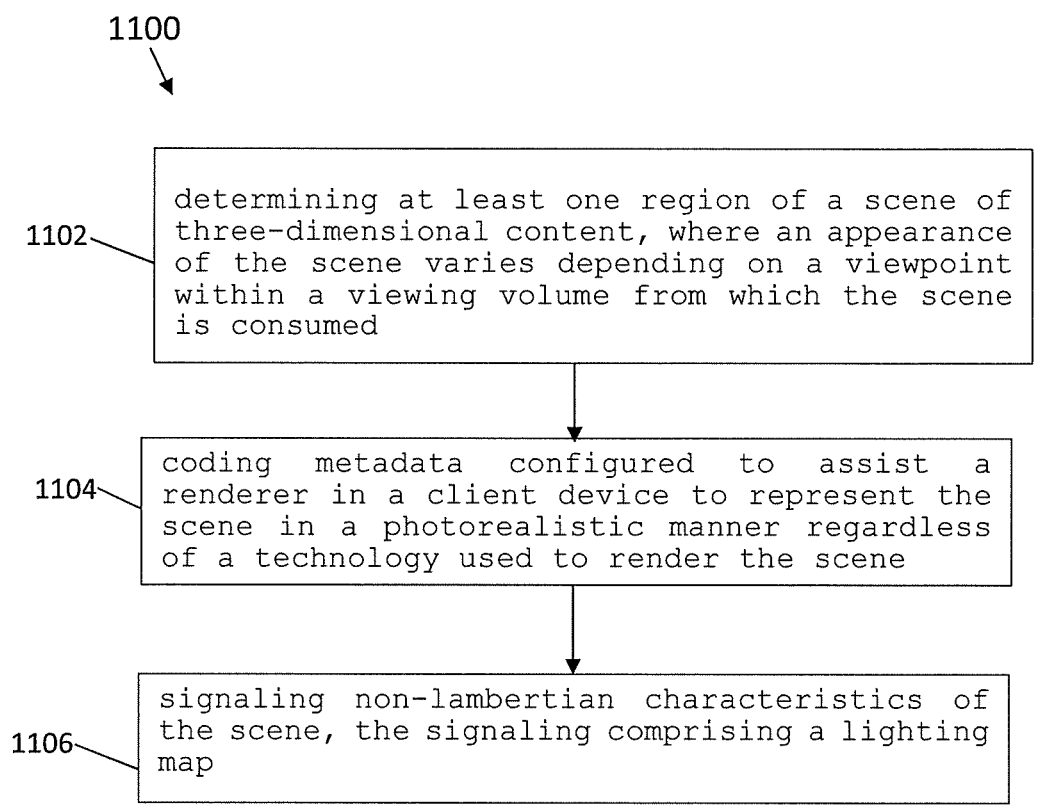
FIG. 11 is an example method to code a scene with non-Lambertian characteristics.

FIG. 11 is an example method to code a scene with non-Lambertian characteristics. At 1102, the method includes determining at least one region of a scene of three-dimensional content, where an appearance of the scene varies depending on a viewpoint within a viewing volume from which the scene is consumed. At 1104, the method includes coding metadata configured to assist a renderer in a client device to represent the scene in a photorealistic manner regardless of a technology used to render the scene. At 1106, the method includes signaling non-lambertian characteristics of the scene, the signaling comprising a lighting map. Method 1100 may be implemented with apparatus 100 or with apparatus 800.

Figure 12:
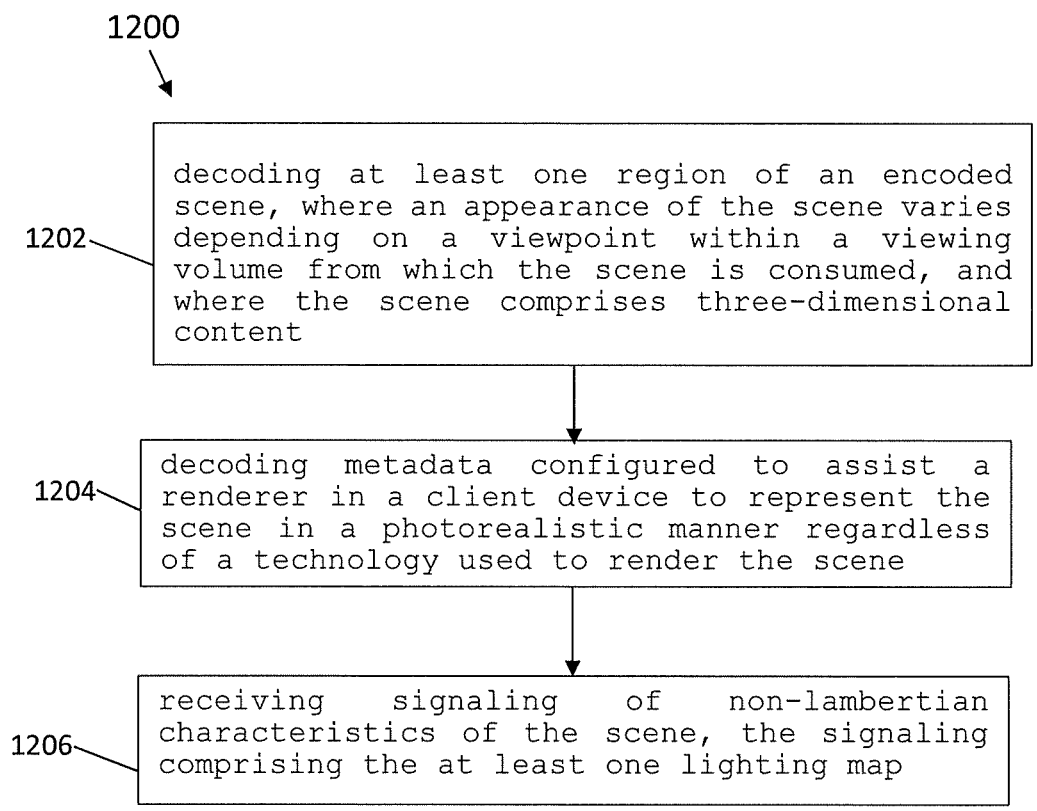
FIG. 12 is an example method to decode a scene with non-Lambertian characteristics.

FIG. 12 is an example method to decode a scene with non-Lambertian characteristics. At 1202, the method includes decoding at least one region of an encoded scene, where an appearance of the scene varies depending on a viewpoint within a viewing volume from which the scene is consumed, and where the scene comprises three-dimensional content. At 1204, the method includes decoding metadata configured to assist a renderer in a client device to represent the scene in a photorealistic manner regardless of a technology used to render the scene. At 1206, the method includes receiving signaling of non-lambertian characteristics of the scene, the signaling comprising the at least one lighting map. Method 1200 may be implemented with apparatus 200 or with apparatus 800.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. Circuitry may also be used to mean a function or a process, such as one implemented by an encoder or decoder, or a codec.

The ideas described herein may be contributed to standardization in MPEG-I: ISO/IEC 23090-5—Visual Volumetric Video-based Coding and Video-based Point Cloud Compression; and/or ISO/IEC 23090-10 Carriage of Visual Volumetric Video-based Coding Data. Further, the examples described herein may be included in 23090-12 ed2, and subsequently in 23090-5 and -10.

An example apparatus includes at least one processor; and at least one non-transitory memory including computer program code; wherein the at least one memory and the computer program code are configured to, with the at least one processor, cause the apparatus at least to: obtain a scene comprising three-dimensional information in the form of point clouds, three-dimensional meshes, two-dimensional projections of three-dimensional information, light sources, animations or any other form considered as a representation or description of three-dimensional content; extract lighting information from the obtained scene; process the extracted lighting information into at least one explicit lighting parameter and/or at least one pre-processed lighting map; and encode the scene with the at least one pre-processed lighting map and/or the at least one lighting parameter in a file format or as a visual volumetric video-based coding bitstream.

Other aspects of the apparatus may include the following. The lighting information may be in the form of explicit light sources comprising point lights or ambient light, or may be provided as image based lighting. The at least one memory and the computer program code may be further configured to, with the at least one processor, cause the apparatus at least to: extract geometry data and attribute data from the obtained scene; wherein the geometry data is three-dimensional information, and the attribute data is used to describe rendering details of the geometry data; process the extracted geometry data and attribute data based on volumetric visual video-based compression or another format for compression of volumetric video information; encode the scene with the processed geometry data and attributes data from the obtained scene; and store the geometry data and attribute data along with the pre-processed lighting information in a file format or visual volumetric video-based coding bitstream. The at least one pre-processed lighting map may be an environment map that captures the scene with lighting information from a center of the scene. The at least one memory and the computer program code may be further configured to, with the at least one processor, cause the apparatus at least to: map the environment map to a plurality of patches, the plurality of patches respectively representing a cube face; and transmit the plurality of patches as a separate lighting video component or as a lighting attribute identified using the signaled lighting information. A patch type may describe the lighting video component, and the patch type may provide mapping information between the plurality of patches and one or more scene objects, wherein the mapping information is based on an object identifier provided as a supplemental enhancement information message or an entity identifier present in the plurality of patches describing attribute, geometry, and occupancy video components. The at least one pre-processed lighting map may be calculated for one or more objects in the scene, or for one or more pre-defined positions in the scene, the one or more pre-defined positions being signaled using the at least one lighting parameter, to identify common parts of the at least one pre-processed lighting map. The at least one memory and the computer program code may be further configured to, with the at least one processor, cause the apparatus at least to: transmit the at least one pre-processed lighting map as one or more patches together with attribute texture. The at least one pre-processed lighting map may represent at least one of: an irradiance map comprising a sum of indirect diffuse light hitting a surface from a given direction used to calculate diffuse lighting for an object in the scene; or a bidirectional reflective distribution function integration map and pre-filtered environment map used to calculate a specular lighting component. The at least one memory and the computer program code may be further configured to, with the at least one processor, cause the apparatus at least to: provide sampling data for the irradiance map or pre-filtered environment map as additional metadata in the at least one lighting parameter so that the irradiance map or pre-filtered environment map is generated from the at least one pre-processed lighting map or from a plurality of patches in real-time during rendering. The at least one lighting parameter may provide information concerning how the at least one pre-processed lighting map is generated and used by a renderer. The at least one lighting parameter may comprise at least one of a lighting source type, position, color/strength, or orientation. The at least one lighting parameter may be signaled using either a supplemental enhancement information message, or as a video usability information ambient message. The at least one lighting parameter may be encoded as a sample of a metadata track using a sample entry. The at least one memory and the computer program code may be further configured to, with the at least one processor, cause the apparatus at least to: encode the at least one pre-processed lighting map as a video sequence; transmit the at least one pre-processed lighting map as a visual volumetric video-based coding bitstream with a lighting video data identifier; and wherein the at least one pre-processed lighting map is interpreted using information provided in at least one of a visual volumetric video-based coding parameter set, a common atlas sequence parameter set, or an atlas sequence parameter set. The at least one memory and the computer program code may be further configured to, with the at least one processor, cause the apparatus at least to: signal information related to the at least one pre-processed lighting map using an extension to a patch data unit. The at least one memory and the computer program code may be further configured to, with the at least one processor, cause the apparatus at least to: signal information related to the at least one pre-processed lighting map using an attribute type; wherein the attribute type comprises a layout of a plurality of patches of the at least one pre-processed lighting map in relation to occupancy, geometry, and attributes with a type different from the attribute type; and wherein the plurality of patches are signaled using either attribute texture patch data, or using one or more lighting patches. The at least one pre-processed lighting map may be encapsulated with the file format as one or more tracks, and identified with a four character code; and the at least one lighting parameter may be encapsulated with the file format in a scheme information box of a restricted scheme information box. The at least one memory and the computer program code may be further configured to, with the at least one processor, cause the apparatus at least to: provide a track reference type used from/to a visual volumetric video-based coding atlas track to/from a visual volumetric video-based coding video component track; wherein the track reference type describes one or more samples with lighting information originated from visual volumetric video-based coding units having a lighting video data type. The lighting information may be extracted using at least one visual volumetric video-based coding construct or at least one file format level method.

The apparatus may further include wherein the at least one memory and the computer program code are further configured to, with the at least one processor, cause the apparatus at least to: determine at least one region of the scene of three-dimensional information, where an appearance of the scene varies depending on a viewpoint within a viewing volume from which the scene is consumed; code metadata configured to assist a renderer in a client device to represent the scene in a photorealistic manner regardless of a technology used to render the scene; and signal non-lambertian characteristics of the scene, the signaling comprising the at least one pre-processed lighting map.

An example apparatus includes at least one processor; and at least one non-transitory memory including computer program code; wherein the at least one memory and the computer program code are configured to, with the at least one processor, cause the apparatus at least to: receive an encoded scene with lighting information signaled in a file format or as a visual volumetric video-based coding bitstream, and with geometry and attributes information associated with the scene; wherein the lighting information comprises at least one pre-processed lighting map or/and at least one lighting parameter associated with the scene; and render a reconstruction of the scene with view-dependent lighting effects on a plurality of surfaces for a given viewer position, using the lighting information and the geometry and attributes information.

Other aspects of the apparatus may include the following. The at least one pre-processed lighting map or/and the at least one lighting parameter associated with the scene may be signaled using at least one visual volumetric video-based coding construct or at least one file format level method. The at least one pre-processed lighting map or/and the at least one lighting parameter associated with the scene may be utilized to render the scene. The at least one pre-processed lighting map may be an environment map that captures the scene with lighting information from a center of the scene. The at least one memory and the computer program code may be further configured to, with the at least one processor, cause the apparatus at least to: receive a plurality of patches as a separate lighting video component or as a lighting attribute identified with the signaled lighting information; wherein the environment map has been mapped to the plurality of patches, the plurality of patches respectively representing a cube face. A patch type may describe the lighting video component, and the patch type may provide mapping information between the plurality of patches and one or more scene objects, wherein the mapping information is based on an object identifier provided as a supplemental enhancement information message or an entity identifier present in the plurality of patches describing attribute, geometry, and occupancy video components. The at least one pre-processed lighting map may be calculated for one or more objects in the scene, or for one or more pre-defined positions in the scene, the one or more pre-defined positions being signaled using the at least one lighting parameter, to identify common parts of the at least one pre-processed lighting map. The at least one memory and the computer program code may be further configured to, with the at least one processor, cause the apparatus at least to: receive the at least one pre-processed lighting map as one or more patches together with attribute texture. The at least one pre-processed lighting map may represent at least one of: an irradiance map comprising a sum of indirect diffuse light hitting a surface from a given direction used to calculate diffuse lighting for an object in the scene; or a bidirectional reflective distribution function integration map and pre-filtered environment map used to calculate a specular lighting component. The at least one memory and the computer program code may be further configured to, with the at least one processor, cause the apparatus at least to: receive sampling data for the irradiance map or pre-filtered environment map as additional metadata in the at least one lighting parameter so that the irradiance map or pre-filtered environment map is generated from the at least one pre-processed lighting map or from a plurality of patches in real-time during rendering. The at least one lighting parameter may provide information concerning how the at least one pre-processed lighting map is generated and used by a renderer. The at least one lighting parameter may comprise at least one of a lighting source type, position, color/strength, or orientation. The at least one lighting parameter may be signaled using either a supplemental enhancement information message, or as a video usability information ambient message. The at least one lighting parameter may be encoded as a sample of a metadata track using a sample entry. The at least one memory and the computer program code may be further configured to, with the at least one processor, cause the apparatus at least to: receive the at least one pre-processed lighting map as a visual volumetric video-based coding bitstream with a lighting video data identifier; wherein the at least one pre-processed lighting map is encoded as a video sequence; and interpret the at least one pre-processed lighting map using information provided in at least one of a visual volumetric video-based coding parameter set, a common atlas sequence parameter set, or an atlas sequence parameter set. The at least one memory and the computer program code may be further configured to, with the at least one processor, cause the apparatus at least to: receive information related to the at least one pre-processed lighting map signaled using an extension to a patch data unit. The at least one memory and the computer program code may be further configured to, with the at least one processor, cause the apparatus at least to: receive information related to the at least one pre-processed lighting map through an attribute type; wherein the attribute type comprises a layout of a plurality of patches of the at least one pre-processed lighting map in relation to occupancy, geometry, and attributes with a type different from the attribute type; and wherein the plurality of patches are signaled with either attribute texture patch data, or with one or more lighting patches. The at least one pre-processed lighting map may be encapsulated with the file format as one or more tracks, and identified with a four character code; and the at least one lighting parameter may be encapsulated with the file format in a scheme information box of a restricted scheme information box. The at least one memory and the computer program code may be further configured to, with the at least one processor, cause the apparatus at least to: decode a track reference type used from/to a visual volumetric video-based coding atlas track to/from a visual volumetric video-based coding video component track; wherein the track reference type describes one or more samples with lighting information originated from visual volumetric video-based coding units having a lighting video data type. The scene may be a three-dimensional scene, and the geometry may be three-dimensional information and attribute information is used to describe rendering details of the geometry. The lighting information may be in the form of explicit light sources comprising point lights or ambient light, or may be provided as image based lighting.

An example apparatus includes means for obtaining a scene comprising three-dimensional information in the form of point clouds, three-dimensional meshes, two-dimensional projections of three-dimensional information, light sources, animations or any other form considered as a representation or description of three-dimensional content; means for extracting lighting information from the obtained scene; means for processing the extracted lighting information into at least one explicit lighting parameter and/or at least one pre-processed lighting map; and means for encoding the scene with the at least one pre-processed lighting map and/or the at least one lighting parameter in a file format or as a visual volumetric video-based coding bitstream.

The apparatus may further include wherein the lighting information is in the form of explicit light sources comprising point lights or ambient light, or is provided as image based lighting.

The apparatus may further include means for extracting geometry data and attribute data from the obtained scene; wherein the geometry data is three-dimensional information, and the attribute data is used to describe rendering details of the geometry data; means for processing the extracted geometry data and attribute data based on volumetric visual video-based compression or another format for compression of volumetric video information; means for encoding the scene with the processed geometry data and attributes data from the obtained scene; and means for storing the geometry data and attribute data along with the pre-processed lighting information in a file format or visual volumetric video-based coding bitstream.

The apparatus may further include wherein the at least one pre-processed lighting map is an environment map that captures the scene with lighting information from a center of the scene.

The apparatus may further include means for mapping the environment map to a plurality of patches, the plurality of patches respectively representing a cube face; and means for transmitting the plurality of patches as a separate lighting video component or as a lighting attribute identified using the signaled lighting information.

The apparatus may further include wherein a patch type describes the lighting video component, and the patch type provides mapping information between the plurality of patches and one or more scene objects, wherein the mapping information is based on an object identifier provided as a supplemental enhancement information message or an entity identifier present in the plurality of patches describing attribute, geometry, and occupancy video components.

The apparatus may further include wherein the at least one pre-processed lighting map is calculated for one or more objects in the scene, or for one or more pre-defined positions in the scene, the one or more pre-defined positions being signaled using the at least one lighting parameter, to identify common parts of the at least one pre-processed lighting map.

The apparatus may further include means for transmitting the at least one pre-processed lighting map as one or more patches together with attribute texture.

The apparatus may further include wherein the at least one pre-processed lighting map represents at least one of: an irradiance map comprising a sum of indirect diffuse light hitting a surface from a given direction used to calculate diffuse lighting for an object in the scene; or a bidirectional reflective distribution function integration map and pre-filtered environment map used to calculate a specular lighting component.

The apparatus may further include means for providing sampling data for the irradiance map or pre-filtered environment map as additional metadata in the at least one lighting parameter so that the irradiance map or pre-filtered environment map is generated from the at least one pre-processed lighting map or from a plurality of patches in real-time during rendering.

The apparatus may further include wherein the at least one lighting parameter provides information concerning how the at least one pre-processed lighting map is generated and used by a renderer.

The apparatus may further include wherein the at least one lighting parameter comprises at least one of a lighting source type, position, color/strength, or orientation.

The apparatus may further include wherein the at least one lighting parameter is signaled using either a supplemental enhancement information message, or as a video usability information ambient message.

The apparatus may further include wherein the at least one lighting parameter is encoded as a sample of a metadata track using a sample entry.

The apparatus may further include means for encoding the at least one pre-processed lighting map as a video sequence; means for transmitting the at least one pre-processed lighting map as a visual volumetric video-based coding bitstream with a lighting video data identifier; and wherein the at least one pre-processed lighting map is interpreted using information provided in at least one of a visual volumetric video-based coding parameter set, a common atlas sequence parameter set, or an atlas sequence parameter set.

The apparatus may further include means for signaling information related to the at least one pre-processed lighting map using an extension to a patch data unit.

The apparatus may further include means for signaling information related to the at least one pre-processed lighting map using an attribute type; wherein the attribute type comprises a layout of a plurality of patches of the at least one pre-processed lighting map in relation to occupancy, geometry, and attributes with a type different from the attribute type; and wherein the plurality of patches are signaled using either attribute texture patch data, or using one or more lighting patches.

The apparatus may further include wherein: the at least one pre-processed lighting map is encapsulated with the file format as one or more tracks, and identified with a four character code; and the at least one lighting parameter is encapsulated with the file format in a scheme information box of a restricted scheme information box.

The apparatus may further include means for providing a track reference type used from/to a visual volumetric video-based coding atlas track to/from a visual volumetric video-based coding video component track; wherein the track reference type describes one or more samples with lighting information originated from visual volumetric video-based coding units having a lighting video data type.

The apparatus may further include wherein the lighting information is extracted using at least one visual volumetric video-based coding construct or at least one file format level method.

The apparatus may further include means for determining at least one region of the scene of three-dimensional information, where an appearance of the scene varies depending on a viewpoint within a viewing volume from which the scene is consumed; means for coding metadata configured to assist a renderer in a client device to represent the scene in a photorealistic manner regardless of a technology used to render the scene; and means for signaling non-lambertian characteristics of the scene, the signaling comprising the at least one pre-processed lighting map.

The apparatus may further include wherein the scene of volumetric content is a natural dynamic volumetric scene comprising at least one non-lambertian surface.

The apparatus may further include wherein the at least one non-lambertian surface comprises a specular surface.

The apparatus may further include wherein the at least one non-lambertian surface comprises a transparent object.

The apparatus may further include means for coding or decoding at least one heterogeneous object-specific parameter at a bitstream level.

The apparatus may further include wherein the at least one heterogeneous object-specific parameter comprises at least one of: a temporal sampling parameter; a duration; an atlas size; or a non-lambertian characteristic.

The apparatus may further include wherein the bitstream level comprises a moving picture experts group immersive bitstream level.

The apparatus may further include means for capturing the at least one region of the scene of three-dimensional information, where the appearance of the scene varies depending on the viewpoint within the viewing volume from which the scene is consumed.

The apparatus may further include wherein the means for capturing comprises at least one camera.

The apparatus may further include where the at least one pre-processed lighting map provides overall lighting information for a plurality of objects within the scene.

An example apparatus includes means for receiving an encoded scene with lighting information signaled in a file format or as a visual volumetric video-based coding bitstream, and with geometry and attributes information associated with the scene; wherein the lighting information comprises at least one pre-processed lighting map or/and at least one lighting parameter associated with the scene; and means for rendering a reconstruction of the scene with view-dependent lighting effects on a plurality of surfaces for a given viewer position, using the lighting information and the geometry and attributes information.

The apparatus may further include wherein the at least one pre-processed lighting map or/and the at least one lighting parameter associated with the scene is signaled using at least one visual volumetric video-based coding construct or at least one file format level method.

The apparatus may further include wherein the at least one pre-processed lighting map or/and the at least one lighting parameter associated with the scene is utilized to render the scene.

The apparatus may further include wherein the at least one pre-processed lighting map is an environment map that captures the scene with lighting information from a center of the scene.

The apparatus may further include means for receiving a plurality of patches as a separate lighting video component or as a lighting attribute identified with the signaled lighting information; wherein the environment map has been mapped to the plurality of patches, the plurality of patches respectively representing a cube face.

The apparatus may further include wherein a patch type describes the lighting video component, and the patch type provides mapping information between the plurality of patches and one or more scene objects, wherein the mapping information is based on an object identifier provided as a supplemental enhancement information message or an entity identifier present in the plurality of patches describing attribute, geometry, and occupancy video components.

The apparatus may further include wherein the at least one pre-processed lighting map is calculated for one or more objects in the scene, or for one or more pre-defined positions in the scene, the one or more pre-defined positions being signaled using the at least one lighting parameter, to identify common parts of the at least one pre-processed lighting map.

The apparatus may further include means for receiving the at least one pre-processed lighting map as one or more patches together with attribute texture.

The apparatus may further include wherein the at least one pre-processed lighting map represents at least one of: an irradiance map comprising a sum of indirect diffuse light hitting a surface from a given direction used to calculate diffuse lighting for an object in the scene; or a bidirectional reflective distribution function integration map and pre-filtered environment map used to calculate a specular lighting component.

The apparatus may further include means for receiving sampling data for the irradiance map or pre-filtered environment map as additional metadata in the at least one lighting parameter so that the irradiance map or pre-filtered environment map is generated from the at least one pre-processed lighting map or from a plurality of patches in real-time during rendering.

The apparatus may further include wherein the at least one lighting parameter provides information concerning how the at least one pre-processed lighting map is generated and used by a renderer.

The apparatus may further include wherein the at least one lighting parameter comprises at least one of a lighting source type, position, color/strength, or orientation.

The apparatus may further include wherein the at least one lighting parameter is signaled using either a supplemental enhancement information message, or as a video usability information ambient message.

The apparatus may further include wherein the at least one lighting parameter is encoded as a sample of a metadata track using a sample entry.

The apparatus may further include means for receiving the at least one pre-processed lighting map as a visual volumetric video-based coding bitstream with a lighting video data identifier; wherein the at least one pre-processed lighting map is encoded as a video sequence; and means for interpreting the at least one pre-processed lighting map using information provided in at least one of a visual volumetric video-based coding parameter set, a common atlas sequence parameter set, or an atlas sequence parameter set.

The apparatus may further include means for receiving information related to the at least one pre-processed lighting map signaled using an extension to a patch data unit.

The apparatus may further include means for receiving information related to the at least one pre-processed lighting map through an attribute type; wherein the attribute type comprises a layout of a plurality of patches of the at least one pre-processed lighting map in relation to occupancy, geometry, and attributes with a type different from the attribute type; and wherein the plurality of patches are signaled with either attribute texture patch data, or with one or more lighting patches.

The apparatus may further include wherein: the at least one pre-processed lighting map is encapsulated with the file format as one or more tracks, and identified with a four character code; and the at least one lighting parameter is encapsulated with the file format in a scheme information box of a restricted scheme information box.

The apparatus may further include means for decoding a track reference type used from/to a visual volumetric video-based coding atlas track to/from a visual volumetric video-based coding video component track; wherein the track reference type describes one or more samples with lighting information originated from visual volumetric video-based coding units having a lighting video data type.

The apparatus may further include wherein the scene is a three-dimensional scene, and the geometry is three-dimensional information and attribute information is used to describe rendering details of the geometry.

The apparatus may further include wherein the lighting information is in the form of explicit light sources comprising point lights or ambient light, or is provided as image based lighting.

The apparatus may further include means for decoding at least one region of the encoded scene, where an appearance of the scene varies depending on a viewpoint within a viewing volume from which the scene is consumed, and where the scene comprises three-dimensional content; means for decoding metadata configured to assist a renderer in a client device to represent the scene in a photorealistic manner regardless of a technology used to render the scene; and means for receiving signaling of non-lambertian characteristics of the scene, the signaling comprising the at least one pre-processed lighting map.

The apparatus may further include wherein the scene of volumetric content is a natural dynamic volumetric scene comprising at least one non-lambertian surface.

The apparatus may further include wherein the at least one non-lambertian surface comprises a specular surface.

The apparatus may further include wherein the at least one non-lambertian surface comprises a transparent object.

The apparatus may further include means for decoding at least one heterogeneous object-specific parameter at a bitstream level.

The apparatus may further include wherein the at least one heterogeneous object-specific parameter comprises at least one of: a temporal sampling parameter; a duration; an atlas size; or a non-lambertian characteristic.

The apparatus may further include wherein the bitstream level comprises a moving picture experts group immersive bitstream level.

The apparatus may further include means for capturing the at least one region of the scene, where the appearance of the scene varies depending on the viewpoint within the viewing volume from which the scene is consumed.

The apparatus may further include wherein the means for capturing comprises at least one camera.

The apparatus may further include where the at least one pre-processed lighting map provides overall lighting information for a plurality of objects within the scene.

An example apparatus includes means for determining at least one region of a scene of three-dimensional content, where an appearance of the scene varies depending on a viewpoint within a viewing volume from which the scene is consumed; means for coding metadata configured to assist a renderer in a client device to represent the scene in a photorealistic manner regardless of a technology used to render the scene; and means for signaling non-lambertian characteristics of the scene, the signaling comprising at least one lighting map.

The apparatus may further include wherein the scene of volumetric content is a natural dynamic volumetric scene comprising at least one non-lambertian surface.

The apparatus may further include wherein the at least one non-lambertian surface comprises a specular surface.

The apparatus may further include wherein the at least one non-lambertian surface comprises a transparent object.

The apparatus may further include means for coding or decoding at least one heterogeneous object-specific parameter at a bitstream level.

The apparatus may further include wherein the at least one heterogeneous object-specific parameter comprises at least one of: a temporal sampling parameter; a duration; an atlas size; or a non-lambertian characteristic.

The apparatus may further include wherein the bitstream level comprises a moving picture experts group immersive bitstream level.

The apparatus may further include means for capturing the at least one region of the scene of three-dimensional content, where the appearance of the scene varies depending on the viewpoint within the viewing volume from which the scene is consumed.

The apparatus may further include wherein the means for capturing comprises at least one camera.

The apparatus may further include where the lighting map provides overall lighting information for a plurality of objects within the scene.

An example apparatus includes means for decoding at least one region of an encoded scene, where an appearance of the scene varies depending on a viewpoint within a viewing volume from which the scene is consumed, and where the scene comprises three-dimensional content; means for decoding metadata configured to assist a renderer in a client device to represent the scene in a photorealistic manner regardless of a technology used to render the scene; and means for receiving signaling of non-lambertian characteristics of the scene, the signaling comprising the at least one lighting map.

The apparatus may further include wherein the scene of volumetric content is a natural dynamic volumetric scene comprising at least one non-lambertian surface.

The apparatus may further include wherein the at least one non-lambertian surface comprises a specular surface.

The apparatus may further include wherein the at least one non-lambertian surface comprises a transparent object.

The apparatus may further include means for decoding at least one heterogeneous object-specific parameter at a bitstream level.

The apparatus may further include wherein the at least one heterogeneous object-specific parameter comprises at least one of: a temporal sampling parameter; a duration; an atlas size; or a non-lambertian characteristic.

The apparatus may further include wherein the bitstream level comprises a moving picture experts group immersive bitstream level.

The apparatus may further include means for capturing the at least one region of the scene, where the appearance of the scene varies depending on the viewpoint within the viewing volume from which the scene is consumed.

The apparatus may further include wherein the means for capturing comprises at least one camera.

The apparatus may further include where the at least one pre-processed lighting map provides overall lighting information for a plurality of objects within the scene.

An example method includes obtaining a scene comprising three-dimensional information in the form of point clouds, three-dimensional meshes, two-dimensional projections of three-dimensional information, light sources, animations or any other form considered as a representation or description of three-dimensional content; extracting lighting information from the obtained scene; processing the extracted lighting information into at least one explicit lighting parameter and/or at least one pre-processed lighting map; and encoding the scene with the at least one pre-processed lighting map and/or the at least one lighting parameter in a file format or as a visual volumetric video-based coding bitstream.

An example method includes receiving an encoded scene with lighting information signaled in a file format or as a visual volumetric video-based coding bitstream, and with geometry and attributes information associated with the scene; wherein the lighting information comprises at least one pre-processed lighting map or/and at least one lighting parameter associated with the scene; and rendering a reconstruction of the scene with view-dependent lighting effects on a plurality of surfaces for a given viewer position, using the lighting information and the geometry and attributes information.

An example method includes determining at least one region of a scene of three-dimensional content, where an appearance of the scene varies depending on a viewpoint within a viewing volume from which the scene is consumed; coding metadata configured to assist a renderer in a client device to represent the scene in a photorealistic manner regardless of a technology used to render the scene; and signaling non-lambertian characteristics of the scene, the signaling comprising at least one lighting map.

An example method includes decoding at least one region of an encoded scene, where an appearance of the scene varies depending on a viewpoint within a viewing volume from which the scene is consumed, and where the scene comprises three-dimensional content; decoding metadata configured to assist a renderer in a client device to represent the scene in a photorealistic manner regardless of a technology used to render the scene; and receiving signaling of non-lambertian characteristics of the scene, the signaling comprising the at least one lighting map.

An example non-transitory program storage device readable by a machine, tangibly embodying a program of instructions executable by the machine for performing operations is provided, the operations comprising: obtaining a scene comprising three-dimensional information in the form of point clouds, three-dimensional meshes, two-dimensional projections of three-dimensional information, light sources, animations or any other form considered as a representation or description of three-dimensional content; extracting lighting information from the obtained scene; processing the extracted lighting information into at least one explicit lighting parameter and/or at least one pre-processed lighting map; and encoding the scene with the at least one pre-processed lighting map and/or the at least one lighting parameter in a file format or as a visual volumetric video-based coding bitstream.

An example non-transitory program storage device readable by a machine, tangibly embodying a program of instructions executable by the machine for performing operations is provided, the operations comprising: receiving an encoded scene with lighting information signaled in a file format or as a visual volumetric video-based coding bitstream, and with geometry and attributes information associated with the scene; wherein the lighting information comprises at least one pre-processed lighting map or/and at least one lighting parameter associated with the scene; and rendering a reconstruction of the scene with view-dependent lighting effects on a plurality of surfaces for a given viewer position, using the lighting information and the geometry and attributes information.

An example apparatus includes at least one processor; and at least one non-transitory memory including computer program code; wherein the at least one memory and the computer program code are configured to, with the at least one processor, cause the apparatus at least to: determine at least one region of a scene of three-dimensional content, where an appearance of the scene varies depending on a viewpoint within a viewing volume from which the scene is consumed; code metadata configured to assist a renderer in a client device to represent the scene in a photorealistic manner regardless of a technology used to render the scene; and signal non-lambertian characteristics of the scene, the signaling comprising at least one lighting map.

The apparatus may further include wherein the scene of volumetric content is a natural dynamic volumetric scene comprising at least one non-lambertian surface.

The apparatus may further include wherein the at least one non-lambertian surface comprises a specular surface.

The apparatus may further include wherein the at least one non-lambertian surface comprises a transparent object.

The apparatus may further include wherein the at least one memory and the computer program code are further configured to, with the at least one processor, cause the apparatus at least to: code or decode at least one heterogeneous object-specific parameter at a bitstream level.

The apparatus may further include wherein the at least one heterogeneous object-specific parameter comprises at least one of: a temporal sampling parameter; a duration; an atlas size; or a non-lambertian characteristic.

The apparatus may further include wherein the at least one memory and the computer program code are further configured to, with the at least one processor, cause the apparatus at least to: capture the at least one region of the scene of three-dimensional content, where the appearance of the scene varies depending on the viewpoint within the viewing volume from which the scene is consumed.

The apparatus may further include wherein the capturing is performed using at least one camera.

The apparatus may further include where the lighting map provides overall lighting information for a plurality of objects within the scene.

An example apparatus includes at least one processor; and at least one non-transitory memory including computer program code; wherein the at least one memory and the computer program code are configured to, with the at least one processor, cause the apparatus at least to: decode at least one region of an encoded scene, where an appearance of the scene varies depending on a viewpoint within a viewing volume from which the scene is consumed, and where the scene comprises three-dimensional content; decode metadata configured to assist a renderer in a client device to represent the scene in a photorealistic manner regardless of a technology used to render the scene; and receive signaling of non-lambertian characteristics of the scene, the signaling comprising the at least one lighting map.

The apparatus may further include wherein the scene of volumetric content is a natural dynamic volumetric scene comprising at least one non-lambertian surface.

The apparatus may further include wherein the at least one non-lambertian surface comprises a specular surface.

The apparatus may further include wherein the at least one non-lambertian surface comprises a transparent object.

The apparatus may further include wherein the at least one memory and the computer program code are further configured to, with the at least one processor, cause the apparatus at least to decode at least one heterogeneous object-specific parameter at a bitstream level.

The apparatus may further include wherein the at least one heterogeneous object-specific parameter comprises at least one of: a temporal sampling parameter; a duration; an atlas size; or a non-lambertian characteristic.

The apparatus may further include wherein the at least one memory and the computer program code are further configured to, with the at least one processor, cause the apparatus at least to capture the at least one region of the scene, where the appearance of the scene varies depending on the viewpoint within the viewing volume from which the scene is consumed.

The apparatus may further include wherein the capturing is performed using at least one camera.

The apparatus may further include where the at least one pre-processed lighting map provides overall lighting information for a plurality of objects within the scene.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows:

2D two-dimensional
3D three-dimensional
3GPP third generation partnership project
4CC four character code
ACL atlas coding layer
ao ambient occlusion
ASIC application-specific integrated circuit
ASPS atlas sequence parameter set
BRDF bidirectional reflectance/reflective distribution function
CASPS common atlas sequence parameter set
CD committee draft
CVS coded V3C sequence
DASH dynamic adaptive streaming over HTTP
EOM enhanced occupancy map
Exp exponential
FDIS final draft international standard
FOI field of illumination
FPGA field-programmable gate array
glTF graphics library/language transmission format
GOP group of pictures
HDR high dynamic range
HEIF high efficiency image file format
HEVC high efficiency video coding
HMD head mounted display
HRD hypothetical reference decoder
HTTP hypertext transfer protocol
IBL image based lighting
id or ID identifier
IEC International Electrotechnical Commission
I/F interface
I/O input/output
ISO International Organization for Standardization
ISOBMFF ISO base media file format
MIV MPEG immersive video
MP4 MPEG-4
MPEG moving picture experts group
MPEG-I MPEG immersive
NAL or nal network abstraction layer
NW network
PBR physically based rendering
RBSP raw byte sequence payload
RGB or r, g, b red, green, blue
SAP stream access point
SEI supplemental enhancement information
TMIV test model for immersive video
TBD to be determined
u(n) unsigned integer using n bits
UE user equipment
ue(v) unsigned integer Exp-Golomb-coded syntax element with the left bit first.
UV "U" and "V" are axes of a 2D texture
V3C visual volumetric video-based coding
VPCC video-based point cloud compression
VPS V3C parameter set
VUI video usability information
XML extensible markup language

What is claimed is:

1. An apparatus comprising:
at least one processor; and
at least one memory storing instructions that, when executed by the at least one processor, cause the apparatus at least to:
obtain a scene comprising three-dimensional information in the form of point clouds, three-dimensional meshes, two-dimensional projections of three-dimensional information, light sources, animations or any other form considered as a representation or description of three-dimensional content;
extract lighting information from the obtained scene;
process the extracted lighting information into at least one explicit lighting parameter or at least one pre-processed lighting map;
encode the scene with the at least one pre-processed lighting map or the at least one lighting parameter in a file format or as a visual volumetric video-based coding bitstream;
signal the at least one pre-processed lighting map or the at least one lighting parameter in the file format or within the visual volumetric video-based coding bitstream;
wherein the signaling of the at least one pre-processed lighting map or the at least one lighting parameter comprises decoupling the at least one pre-processed lighting map or the at least one lighting parameter from scene geometry information and surface attribute information in the file format or as separate visual volumetric video-based coding bitstreams; and
signal, using a one-bit indication, that the at least one pre-processed lighting map or the at least one lighting parameter is present in the file format or within the visual volumetric video-based coding bitstream.

2. The apparatus of claim 1, wherein the apparatus is further caused to:
- determine at least one region of the scene of three-dimensional information, where an appearance of the scene varies depending on a viewpoint within a viewing volume from which the scene is consumed;
- code metadata configured to assist a renderer in a client device to represent the scene in a photorealistic manner regardless of a technology used to render the scene; and
- signal non-lambertian characteristics of the scene, the signaling of the non-lambertian characteristics of the scene comprising the at least one pre-processed lighting map.

3. An apparatus comprising:
- at least one processor; and
- at least one non-transitory memory storing instructions that, when executed by the at least one processor, cause the apparatus at least to:
- determine at least one region of a scene of three-dimensional content, where an appearance of the scene varies depending on a viewpoint within a viewing volume from which the scene is consumed;
- code metadata configured to assist a renderer in a client device to represent the scene in a photorealistic manner regardless of a technology used to render the scene;
- signal non-lambertian characteristics of the scene, the signaling comprising at least one lighting map;
- wherein the signaling of the at least one lighting map comprises decoupling the at least one lighting map from scene geometry information and surface attribute information in a file format or as separate visual volumetric video-based coding bitstreams; and
- signal, using a one-bit indication, that the at least one lighting map is present in the file format or within at least one visual volumetric video-based coding bitstream of the visual volumetric video-based coding bitstreams.

4. The apparatus of claim 3, wherein the scene of volumetric content is a natural dynamic volumetric scene comprising at least one non-lambertian surface, wherein the at least one non-lambertian surface comprises a specular surface or a transparent object.

5. The apparatus of claim 3, wherein the at least one lighting map comprises an irradiance map comprising a sum of indirect diffuse light hitting a surface from a finite number of directions.

6. The apparatus of claim 3, wherein the at least one lighting map comprises a bidirectional reflectance distribution function configured to be used to calculate a specular lighting component.

7. The apparatus of claim 3, wherein the apparatus is further caused to:
- code or decode at least one heterogeneous object-specific parameter at a bitstream level.

8. The apparatus of claim 7, wherein the at least one heterogeneous object-specific parameter comprises at least one of:
- a temporal sampling parameter;
- a duration;
- an atlas size; or
- a non-lambertian characteristic.

9. The apparatus of claim 3, wherein the apparatus is further caused to:
- capture the at least one region of the scene of three-dimensional content, where the appearance of the scene varies depending on the viewpoint within the viewing volume from which the scene is consumed.

10. The apparatus of claim 9, wherein the capturing is performed using at least one camera.

11. The apparatus of claim 3, where the lighting map provides overall lighting information for a plurality of objects within the scene.

12. An apparatus comprising:
- at least one processor; and
- at least one memory storing instructions that, when executed by the at least one processor, cause the apparatus at least to:
- decode at least one region of an encoded scene, where an appearance of the scene varies depending on a viewpoint within a viewing volume from which the scene is consumed, and where the scene comprises three-dimensional content;
- decode metadata configured to assist a renderer in a client device to represent the scene in a photorealistic manner regardless of a technology used to render the scene;
- receive signaling of non-lambertian characteristics of the scene, the signaling comprising at least one lighting map;
- wherein the signaling of the at least one lighting map is received such that the at least one lighting map is decoupled from scene geometry information and surface attribute information in a file format or as separate visual volumetric video-based coding bitstreams; and
- receive signaling, with use of a one-bit indication, that the at least one lighting map is present in the file format or within the at least one visual volumetric video-based coding bitstream of the visual volumetric video-based coding bitstreams.

13. The apparatus of claim 12, wherein the scene of volumetric content is a natural dynamic volumetric scene comprising at least one non-lambertian surface, wherein the at least one non-lambertian surface comprises a specular surface or a transparent object.

14. The apparatus of claim 13, wherein the apparatus is further caused to:
- receive lighting signaling;
- determine, from among a set of patches having texture information and lighting information, the set of patches having lighting information;
- wherein the set of patches having the lighting information is determined based on the received lighting signaling; and
- determine an irradiance of the scene using the set of patches having the lighting information.

15. The apparatus of claim 14, wherein the apparatus is further caused to:
- generate an environment map of at least one object within the scene using the set of patches having the lighting information;
- determine the irradiance of the scene using the environment map of the at least one object; and
- render the at least one object within scene based on the determined irradiance of the scene.

16. The apparatus of claim 12, wherein the apparatus is further caused to:
- decode at least one heterogeneous object-specific parameter at a bitstream level.

17. The apparatus of claim 16, wherein the at least one heterogeneous object-specific parameter comprises at least one of:
- a temporal sampling parameter;
- a duration;
- an atlas size; or
- a non-lambertian characteristic.

18. The apparatus of claim 12, wherein the apparatus is further caused to:
  capture the at least one region of the scene, where the appearance of the scene varies depending on the viewpoint within the viewing volume from which the scene is consumed.

19. The apparatus of claim 18, wherein the capturing is performed using at least one camera.

20. The apparatus of claim 12, where the at least one lighting map provides overall lighting information for a plurality of objects within the scene.

\* \* \* \* \*